United States Patent
Schwimer

(10) Patent No.: US 8,805,975 B2
(45) Date of Patent: *Aug. 12, 2014

(54) USING ROUTING PROTOCOLS TO OPTIMIZE RESOURCE UTILIZATION

(75) Inventor: Greg Schwimer, Cave Creek, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 346 days.

This patent is subject to a terminal disclaimer.

(21) Appl. No.: 12/331,278

(22) Filed: Dec. 9, 2008

(65) Prior Publication Data

US 2010/0146148 A1  Jun. 10, 2010

(51) Int. Cl.
| | |
|---|---|
| *G06F 15/177* | (2006.01) |
| *H04L 29/08* | (2006.01) |
| *H04L 12/24* | (2006.01) |
| *G06F 17/30* | (2006.01) |
| *H04L 29/12* | (2006.01) |
| *G06F 15/173* | (2006.01) |
| *H04L 12/56* | (2006.01) |

(52) U.S. Cl.
CPC ........... *H04L 41/082* (2013.01); *H04L 67/2814* (2013.01); *H04L 41/06* (2013.01); *G06F 17/3089* (2013.01); *H04L 61/1511* (2013.01); *H04L 41/0816* (2013.01); *H04L 67/1008* (2013.01); *H04L 67/1002* (2013.01); *G06F 15/173* (2013.01); *H04L 67/306* (2013.01); *H04L 43/22* (2013.01); *H04L 41/22* (2013.01); *H04L 29/12301* (2013.01); *H04L 67/1012* (2013.01); *H04L 29/12066* (2013.01); *H04L 45/02* (2013.01)
USPC .......................................... 709/221; 709/226

(58) Field of Classification Search
CPC ..................... H04L 67/1002; H04L 29/12066; H04L 61/1511; H04L 41/0816; H04L 67/1008; H04L 67/1012; H04L 29/12301; H04L 41/22; H04L 45/02; H04L 61/2076; H04L 67/2814; H04L 43/0876; G06F 17/3089
USPC .................................................. 709/221, 226
See application file for complete search history.

(56) References Cited

U.S. PATENT DOCUMENTS

| | | |
|---|---|---|
| 6,148,064 A | 11/2000 | Christensen et al. |
| 6,233,577 B1 | 5/2001 | Ramasubramani et al. |
| 6,351,745 B1 | 2/2002 | Itakura et al. |
| 6,868,444 B1 | 3/2005 | Kim et al. |
| 7,194,552 B1 | 3/2007 | Schneider |
| 7,383,327 B1 * | 6/2008 | Tormasov et al. ............ 709/220 |
| 2001/0011255 A1 | 8/2001 | Asay et al. |
| 2001/0046227 A1 | 11/2001 | Matsuhira et al. |
| 2004/0107266 A1 * | 6/2004 | Tanaka et al. ................. 709/217 |
| 2005/0105513 A1 | 5/2005 | Sullivan et al. |
| 2006/0193333 A1 * | 8/2006 | Baughan et al. ............. 370/400 |
| 2006/0198322 A1 * | 9/2006 | Hares ............................ 370/254 |

(Continued)

OTHER PUBLICATIONS

Cisco01; "Chapter 7: Configuring Switches"; Apr. 14, 2008; www.cisco.com; pp. 1-9.*

(Continued)

*Primary Examiner* — Oleg Survillo

(74) *Attorney, Agent, or Firm* — Chris A. Watt

(57) ABSTRACT

Systems and methods for optimizing resource utilization among a group of hardware resources using a routing protocol by migrating a hosted account and an associated IP address from a first network resource to a second network resource in response to a resource utilization change.

20 Claims, 20 Drawing Sheets

(56) References Cited

U.S. PATENT DOCUMENTS

| | | | |
|---|---|---|---|
| 2006/0245433 A1* | 11/2006 | Berg et al. | 370/395.31 |
| 2007/0061462 A1* | 3/2007 | Kim et al. | 709/226 |
| 2007/0061465 A1* | 3/2007 | Kim et al. | 709/226 |
| 2007/0153691 A1* | 7/2007 | Halpern | 370/230 |
| 2007/0180436 A1* | 8/2007 | Travostino et al. | 717/138 |
| 2007/0291739 A1 | 12/2007 | Sullivan et al. | |
| 2008/0019359 A1 | 1/2008 | Droux et al. | |
| 2009/0150527 A1* | 6/2009 | Tripathi et al. | 709/221 |
| 2009/0157882 A1* | 6/2009 | Kashyap | 709/227 |
| 2010/0027420 A1* | 2/2010 | Smith | 370/235 |

OTHER PUBLICATIONS

Solaris03; "System Administration Guide: Solaric Containers—Resource Management and Solaris Zones"; Jan. 2005; Sun Microsystems Inc.; pp. 1-334.*

Cisco; "Configuring Virtual Interfaces"; May 2, 2005; Cisco Systems Inc.; excerpt from Cisco IOS Interface and Hardware Component Configuration Guide; pp. 1-12.*

Solaris03; "System Administration Guide: Solaris Containers—Resource Management and Solaris Zones"; Jan. 2005; Sun Microsystems Inc; pp. 1-334.

CertaintySolutions; "Understanding DNS: How to Register for, Configure, and Change DNS Service"; Sep. 2000; Certainty Solutions Inc; pp. 1-7.

QuackIT; "Cold Fusion Administration"; Oct. 14, 2007; QuackIT. com; pp. 1-3.

Microsoft01; "Static routing design considerations"; Jan. 21, 2005; www.microsoft.com; pp. 1-2.

Apr. 5, 2011 Non-Final Rejection, U.S. Appl. 12/331,267 (Publication US 2010-0146147 A1).

Jul. 1, 2011 Response to Apr. 5, 2011 Non-Final Rejection, U.S. Appl. No. 12/331,267 (Publication US 2010-0146147 A1).

Apr. 5, 2011 Non-Final Rejection, U.S. Appl. No. 12/331,269 (Publication US 2010-0146086 A1).

Jul. 1, 2011 Response to Apr. 5, 2011 Non-Final Rejection, U.S. Appl. No. 12/331,269 (Publication US 2010-0146086 A1).

Apr. 5, 2011 Non-Final Rejection, U.S. Appl. No. 12/331,275 (Publication US 2010-0146121 A1).

Jul. 1, 2011 Response to Apr. 5, 2011 Non-Final Rejection, U.S. Appl. No. 12/331,275 (Publication US 2010-0146121 A1).

Apr. 1, 2011 Non-Final Rejection, U.S. Appl. No. 12/331,278 (Publication US 2010-0146148 A1).

Jul. 1, 2011 Response to Apr. 1, 2011 Non-Final Rejection, U.S. Appl. No. 12/331,278 (Publication US 2010-0146148 A1).

Unpublished U.S. Appl. No. 12/136,659, filed Jun. 10, 2008.

Unpublished U.S. Appl. No. 12/136,677, filed Jun. 10, 2008.

Oct. 25, 2011 office action in related U.S. Appl. No. 12/331,267.

Jan. 25, 2012 response to Oct. 25, 2011 office action in related U.S. Appl. No. 12/331,267.

Oct. 25, 2011 office action in related U.S. Appl. No. 12/331,269.

Jan. 25, 2012 response to Oct. 25, 2011 office action in related U.S. Appl. No. 12/331,269.

Oct. 25, 2011 office action in related U.S. Appl. No. 12/331,275.

Jan. 25, 2012 response to Oct. 25, 2011 office action in related U.S. Appl. No. 12/331,275.

Jun. 13, 2014 Notice of Allowance in related U.S. Appl. No. 12/331,267.

Jun. 11, 2014 Notice of Allowance in related U.S. Appl. No. 12/331,275.

* cited by examiner

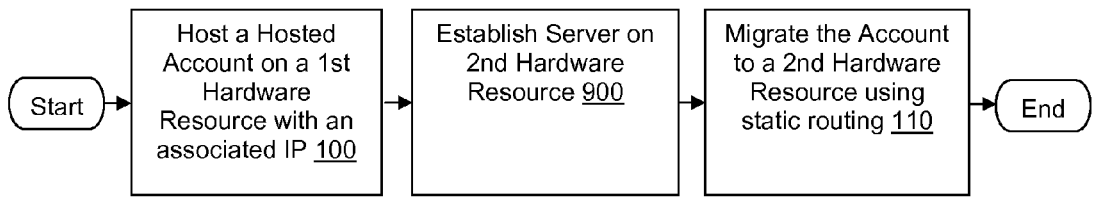

FIG. 9

```
Network Management – Establish Server                    □□□
File  Edit  Options  Window  Help Shared Hosting Migration – Establish Server The Shared Hosting IP Address 123.456.0 is bound to the Hosted Account
exampleaccount.com and is attached to and being managed by a loopback interface.

To migrate this account, a server must be established on the destination hardware
resource; please select a hardware resource on which to establish the server:
         Migrate From:                         Migrate To:

[ 1st Hardware Resource   ▽ ]        [ 2nd Hardware Resource   ▽ ]
  [ 2nd Hardware Resource      ]        [ 1st Hardware Resource      ]

[ UPDATE HARDWARE RESOURCE ]
```

FIG. 10

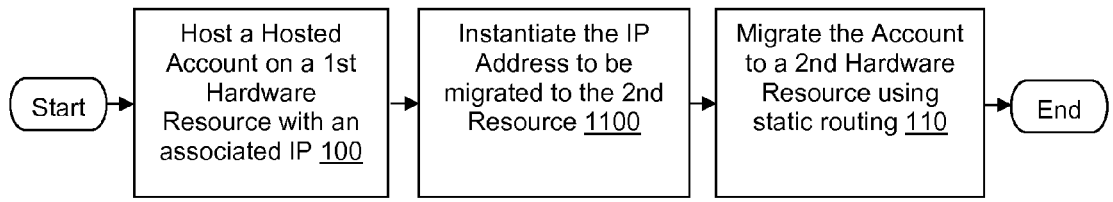

Network Management – Instantiation of IP Address

File  Edit  Options  Window  Help

Hosted Account Migration – Instantiation of IP Address

The IP Address 123.456.0 is bound to the Hosted Account exampleaccount.com and is attached to and being managed by a loopback interface.

You have selected 2nd Hardware Resource as the destination hardware resource on which the instance of the IP 123.456.0 should be migrated to. Please confirm this instantiation by clicking the button below:

CONFIRM INSTANTIATION

FIG. 12

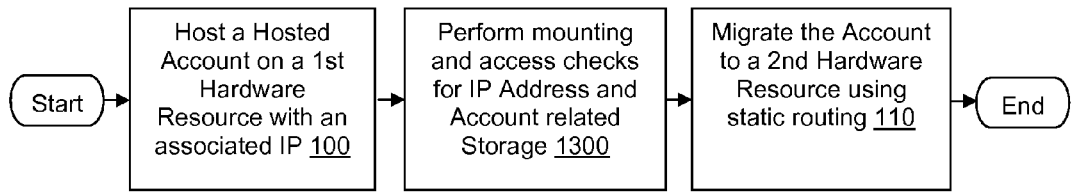

FIG. 13

Network Management – Shared Storage Checks

File   Edit   Options   Window   Help

Hosted Account Migration – Shared Storage Checks

The following checks will be performed for shared storage on 2nd Hardware Resource which is associated with IP 123.456.0 and Hosted Account exampleaccount.com:

Mounting checks:   ......... Mounting Checks for Shared Storage Complete   √

Access checks:   ......... Access Checks for Shared Storage Complete   √

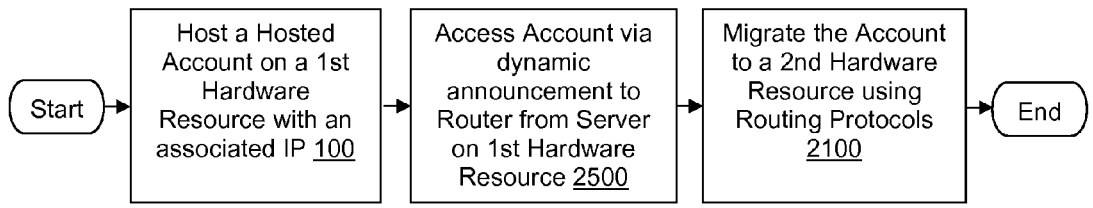

Network Management – Hosted Account Access

File  Edit  Options  Window  Help

Hosted Account Access

The routing table shows that Hosted Account exampleaccount.com is currently accessible through a Server Software on 1st Hardware Resource.

The currently used OSPF routing protocol is sending a dynamic announcement to the upstream router indicating that access to exampleaccount.com is being provided via 1st Hardware Resource. To change to a different hardware resource, please select below:

| 1st Hardware Resource ▽ |
| 2nd Hardware Resource |

[ UPDATE ROUTING TABLE ]

FIG. 26

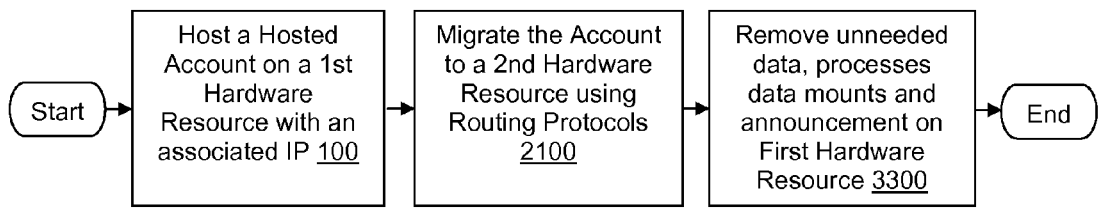

FIG. 33

| Network Management – Removal and Clean Up | |
|---|---|
| File  Edit  Options  Window  Help | |

Hosted Account Migration – Removal and Clean Up

The following procedures will be performed for 1st Hardware Resource:

| | |
|---|---|
| Removal of Configuration Data: | ... Removal of Configuration Data Complete  √ |
| Removal of Processes: | ... Removal of Processes Complete  √ |
| Removal of Data Mounts: | ... Removal of Data Mounts Complete  √ |
| Removal of Announcement: | ... Removal of Announcement Complete  √ |

[ COMPLETE MIGRATION ]

FIG. 34

USING ROUTING PROTOCOLS TO OPTIMIZE RESOURCE UTILIZATION

CROSS REFERENCE TO RELATED PATENT APPLICATIONS

This patent application is related to the following concurrently-filed patent applications:

U.S. patent application Ser. No. 12/331,267, "USING STATIC ROUTING TO MIGRATE A HOSTED ACCOUNT."

U.S. patent application Ser. No. 12/331,269, "USING ROUTING PROTOCOLS TO MIGRATE A HOSTED ACCOUNT."

U.S. patent application Ser. No. 12/331,275, "USING STATIC ROUTING TO OPTIMIZE RESOURCE UTILIZATION."

The subject matter of all patent applications is commonly owned and assigned to Go Daddy Operating Company, LLC. All prior applications are incorporated herein in their entirety by reference.

FIELD OF THE INVENTION

The present inventions generally relate to the field of networking and, more specifically, methods and systems for migrating resources and balancing resources in a shared pool using such migration.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

SUMMARY OF THE INVENTION

The present invention provides methods and systems for migrating a hosted account and Internet protocol (IP) address among a group of resources using static routing or routing protocols and may be used to optimize resource utilization, thus overcoming substantial limitations in the relevant art.

An exemplary method of using static routing to migrate a hosted account and IP address among a group of resources may comprise several steps including the step of hosting a hosted account on a first hardware resource. The hosted account may be associated with an IP address. Static routing may be used to migrate the hosted account and the IP address to a second hardware resource.

An exemplary method of using a routing protocol to migrate a hosted account and IP address among a group of resources may comprise several steps including the step of hosting a hosted account on a first hardware resource. The hosted account may be associated with an IP address. A routing protocol may be used to migrate the hosted account and the IP address to a second hardware resource.

An exemplary method of using static routing to optimize resource utilization may comprise several steps including the step of receiving an alert of a change that may affect resource utilization within the resource pool. Static routing may be used to migrate the hosted account and the IP address in response to the resource utilization change.

An exemplary method of using a routing protocol to optimize resource utilization may comprise several steps including the step of receiving an alert of a change that may affect resource utilization within the resource pool. A routing protocol may be used to migrate the hosted account and the IP address in response to the resource utilization change.

The above features and advantages of the present invention will be better understood from the following detailed description taken in conjunction with the accompanying drawings.

BRIEF DESCRIPTION OF THE DRAWINGS

FIG. 9 is a flow diagram illustrating a possible embodiment including establishing a server on a hardware resource.

FIG. 10 illustrates a possible embodiment of an interface for establishing a server on a hardware resource.

FIG. 11 is a flow diagram illustrating a possible embodiment including instantiating the IP address to be migrated.

FIG. 12 illustrates a possible embodiment of an interface for instantiating the IP address to be migrated.

FIG. 13 is a flow diagram illustrating a possible embodiment including performing mounting and access checks for shared storage associated with a hosted account.

FIG. 14 illustrates a possible embodiment of an interface for performing mounting and access checks for shared storage associated with a hosted account.

FIG. 25 is a flow diagram illustrating a possible embodiment including a server providing access to the account via dynamic announcement to an upstream router.

FIG. 26 illustrates a possible embodiment of an interface for enabling a server to provide access to the account via dynamic announcement to an upstream router.

FIG. 33 is a flow diagram illustrating a possible embodiment including removing configuration data, processes, unneeded data mounts and dynamic announcement on the first hardware resource.

FIG. 34 illustrates a possible embodiment of an interface for removing configuration data, processes, unneeded data mounts and dynamic announcement on the first hardware resource.

DETAILED DESCRIPTION

Figure 1:
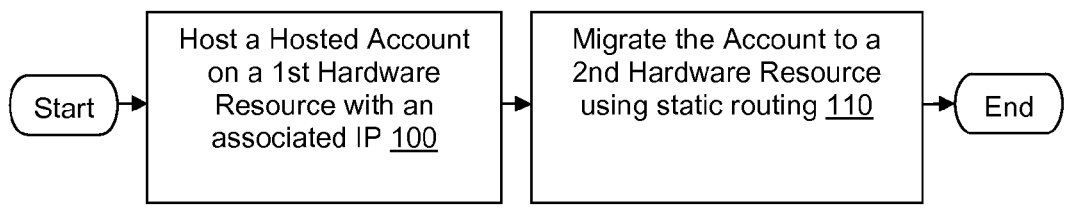
FIG. 1 is a flow diagram illustrating a possible embodiment of a method for using static routing to migrate a hosted account among resources.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A Method of Using Static Routing to Migrate a Shared Hosting Account

Several different methods may be used to provide and manage the disclosed invention. In an example embodiment illustrated in FIG. 1, a Hosted Account on a First Hardware Resource may be associated with a Shared Hosting Internet Protocol (IP) Address (Step 100). Static routing may then be used to migrate the Hosted Account to a Second Hardware Resource using static routing (Step 110).

The example embodiments shown and described exist within the framework of a network and should not limit possible network configuration or connectivity. Such a network may comprise any combination of the Internet, an intranet, an extranet, a local area network, a wide area network, a wired network, a wireless network, a telephone network, or any other known or later developed network.

Non-limiting examples of network hardware resources which may be used in the framework of the present invention may include switches, hubs, gateways, access points, network interface cards, network bridges, modems, ISDN adapters, firewalls, datacenter equipment such as file servers, database servers and storage areas, network services such as DNS, DHCP, email and content delivery.

Static routing may include the use of fixed routes that may be manually entered by an administrator of a network into a network router's configuration. This may require the network administrator to manually update the static route in response to resource utilization changes if the static route is entered into the configuration. In other words, when network changes occur, the administrator may update the router configuration to include the changes. Because such manual updating of the router configuration may be time consuming, static routing may be used in a small network environment.

Figure 2:
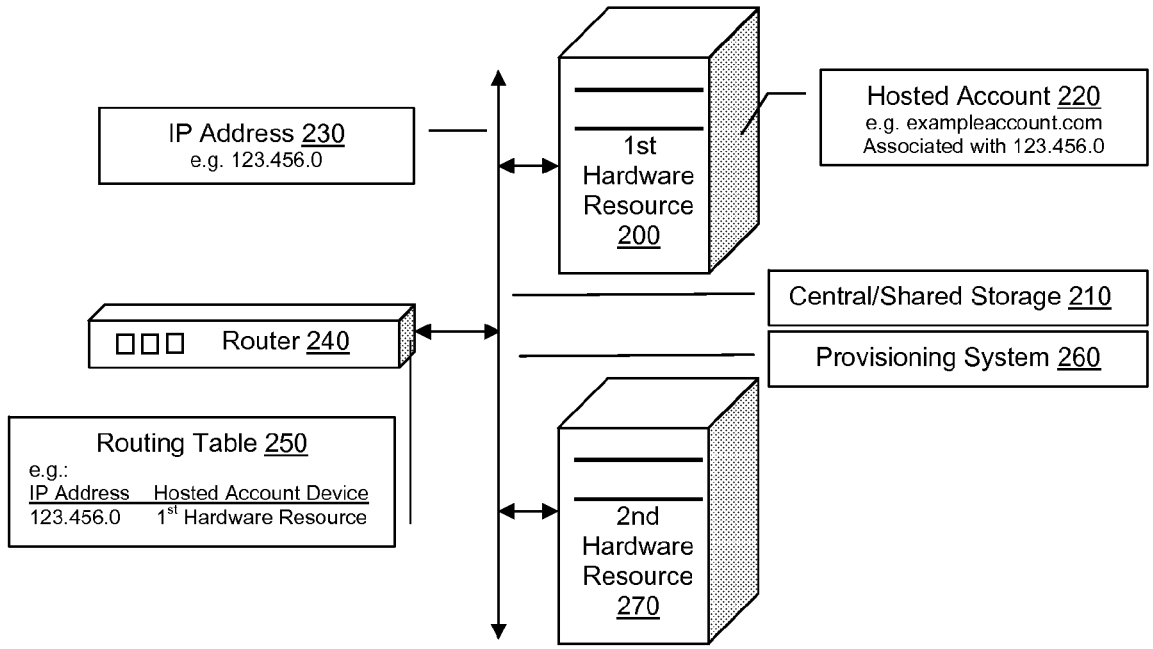
FIG. 2 illustrates a possible environment wherein a hosted account may be migrated among resources using a static route.

Several different environments may be used to complete the steps accomplished by the disclosed invention. FIG. 2 demonstrates a streamlined example of such an environment. A First Hardware Resource 200 and a Second Hardware Resource 270 may be, or may be used for applications and/or processes related to a Server, and may be part of a group of resources, possibly part of a server cluster serviced by a common Router 240. A Hosted Account 220 may be hosted using Server resources in addition to Central/Shared Storage 210. An IP Address 230 may be associated with the Hosted Account 220. A Routing Table 250 on the Router 240 may contain a route/path used to direct network traffic for the IP Address 230 to the Hosted Account 220.

A Provisioning System 260 may be used to assign the Hosted Account 220 to the IP Address 230. The Provisioning System 260 may also use static routing to migrate the Hosted Account 220 and its associated IP Address 230 from the First Hardware Resource 200 to a Second Hardware Resource 270. This environment and its components, as described in detail elsewhere in this disclosure, may provide the structure for various means for executing the steps involved in accomplishing the invention as disclosed.

This environment may also include an autonomous system. The autonomous system may be a collection of connected IP routing prefixes under the control of one or more network operators that presents a common, clearly defined routing policy.

The current system may also reside within a Virtual Local Area Network (VLAN) environment, which may be a group of hosts with a common set of requirements that communicate as if they were attached to the Broadcast domain, regardless of their physical location.

As previously described, the First Hardware Resource 200 and a Second Hardware Resource 270 may be part of a group of resources, possibly part of a server cluster serviced by a common Router 240. However, in a possible VLAN environment, these resources, although having the same attributes as a Local Area Network (LAN) may allow for resources to be grouped together, even if they are not located on the same router and/or network switch. This would allow reconfiguration to be accomplished through software or other means instead of physically relocating devices/resources.

The First Hardware Resource 200 and Second Hardware Resource 270 may be any device, process, application or piece of information such as a Server or any other network hardware resource which may facilitate the use of a computer network and may be remotely accessed from another computer or other network resource. FIG. 2 shows the First Hardware Resource 200 and Second Hardware Resource 270 as servers for demonstrative purposes only, possibly representing the Server containing and/or sharing resources for the Shared/Central Storage 210, and should in no way limit the scope of the current invention.

The First Hardware Resource 200 and/or Second Hardware Resource 270 may be the Server or may be used for applications and/or processes related to server functionality and may include any combination of known or later developed server technologies or formats capable of providing access to the Hosted Account 220 via static routing placed on the upstream Router 240 as disclosed elsewhere in this specification.

Such technologies or formats may include, but are not limited to shared hosting, virtual dedicated hosting, dedicated hosting, or any combination thereof. The type of Server should likewise not be limited, and may include a Web Hosting Server, a DNS Server, a Mail Server, other Servers now known or later developed in the art, or any combination thereof.

The Central/Shared Storage 210 may be any computer components, devices, and/or recording media that may retain digital data used for computing for some interval of time. The storage may be capable of hosting the Hosted Account 220 on a single machine or in a cluster of computers over the network.

As non-limiting examples, the Central/Shared Storage 210 may be Network-Attached Storage ("NAS"—self contained file level computer data storage connected to and supplying a computer network file-based data storage services), a Storage Area Network ("SAN"—an architecture to attach remote computer storage devices to servers in such a way that the devices appear as locally attached), any combination thereof such as a NAS-SAN hybrid, or any other means of central/shared storage now known or later developed. To include and simplify the depiction of such environments in FIG. 2 and subsequent figures, the Central/Shared Storage 210 is labeled between the two networked hardware resources. This should in no way limit the scope of the current invention.

The Hosted Account 220 may be an account on a hosting service or virtual hosting service communicatively coupled to a network. Each account may sit on its own partition or section/place on a Server to keep it separate from other accounts, or may be hosted on its own dedicated Server. Just as the Server may be any Server known in the art, the Hosted Account 220 may likewise be any account associated with such a Server. Thus, the Hosted Account 220 may be an account for a web hosting service, an email account, a DNS administrator account, etc. As a non-limiting example, the Hosted Account 220 is shown in FIG. 2 and subsequent figures as "exampleaccount.com."

The IP Address 230 may be a numerical identification or logical address that is assigned to devices participating in a computer network utilizing the Internet Protocol for communication between its nodes. The IP Address 230 may serve multiple hostnames on a single machine with a single IP address, may include a requested hostname as part of the request to determine the Hosted Account 220 to display to a customer using the Hosted Account 220, or may use IP-based virtual hosting, also known as dedicated IP hosting, in which each virtual host has a different IP address.

In the Context of the IP Address 230, hostnames and IP addresses may not necessarily match on a one-to-one basis. Many hostnames may correspond to a single IP address. Combined with shared and/or virtual hosting, this may allow a single machine to serve many accounts via Hosted Accounts 220. Alternatively, a single hostname may correspond to many IP addresses. This may be used to facilitate fault tolerance and load distribution, and may also allow a site to move physical location seamlessly.

As a non-limiting example, the IP Address 230 is shown in FIG. 2 and subsequent figures in the simplified form of 123.456.0, and is shown for example purposes to be associated with and/or bound to Hosted Account 220 "exampleaccount.com."

The Router 240 may be any computer or network component whose software and hardware are tailored to the task of routing and forwarding information. The Routing Table 250 may be an electronic table, file and/or database type object stored in the Router 240 or a networked computer which stores the routes and/or metrics associated with those routes to particular network destinations. The information on the Routing Table 250 may further include information about the utilization of the network around it. The construction of the Routing Table 250 may be the primary goal of routing protocols and static routes, discussed in more detail elsewhere in this application.

Figure 6:
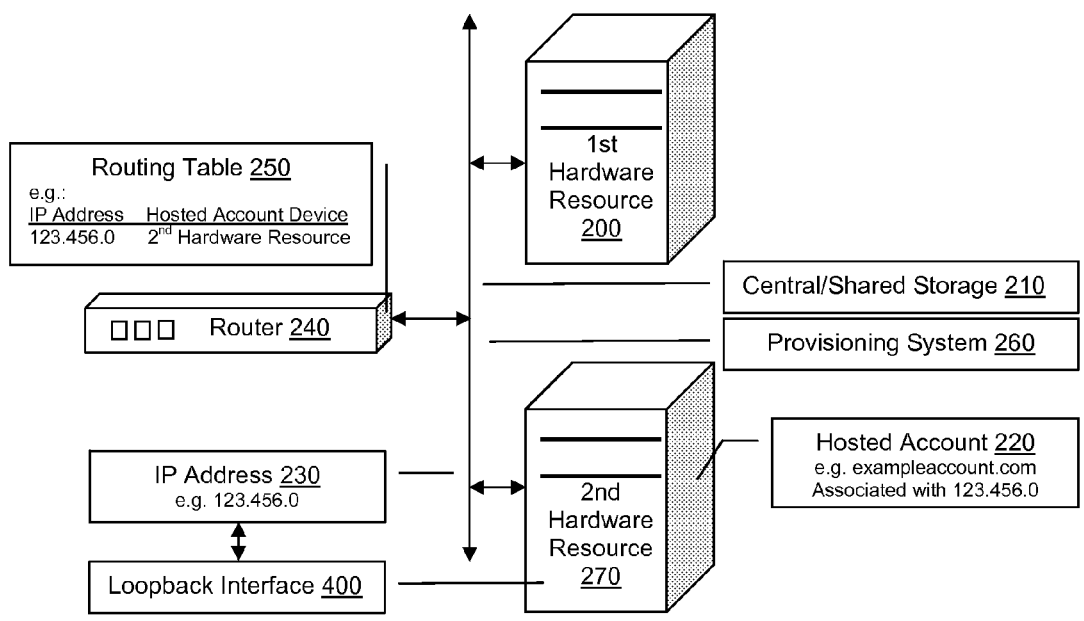
FIG. 6 illustrates a possible environment wherein a user's DNS entries are not affected by the migration.

As a non-limiting example, the simplified Routing Table 250 on Router 240 shows 123.456.0 being routed to the First Hardware Resource 200 in FIG. 2 and subsequent figures and routed to the Second Hardware Resource 270 in FIG. 6.

The Provisioning System 260 may be any system capable of a data migration process, which may further include transferring data, applications and/or processes between storage types, formats and/or computer systems. The Provisioning System 260 may also assign the Hosted Account 220 to the IP Address 230. To include and simplify the depiction of environments such as that seen in FIG. 2 and subsequent figures, the Provisioning System 260 is labeled between the two networked hardware resources used in the migration.

Many steps may be used to accomplish such a migration. These steps may include, but are not limited to any combination of the following: selecting a resource from a pool of available resources; loading the appropriate software such as operating system, device drivers, middleware, applications and/or processes; appropriately customizing and configuring the system software to create or change a configuration for the resource, and change its parameters; auditing the system, such as ensuring compliance or install patches, starting the resource, making a file system ready for use by an operating system, reading certain index data structures from storage into memory prior to mounting, mapping an associated drive, verifying data to determine whether the data was accurately translated, is complete and supports processes in the new system/resource and running both systems in parallel to identify areas of disparity and forestall erroneous data loss; mapping data from the old system/resource to the new system/resource; providing a design for data extraction, where data is read from the old system/resource; data loading, where data is written to the new system/resource and relating old data formats to the new system/resource's formats and requirements, as well as any other known or later developed migration steps. Such data migration phases including design, extraction, cleansing, load and verification for applications may be repeated several times before the new system is deployed.

It should be noted that the migration accomplished by any combination of the steps listed above is not limited to migrating applications. Any process, such as Server processes may likewise be migrated using any combination of the previously listed steps. As a non-limiting example, in a shared hosting server environment, processes such as server processes may be migrated rather than requiring a migration of an entire operating system.

Furthermore, during the migration, if the resources/systems have read/write capabilities (permissions or access rights which control the ability of applications, processes and/or accounts on the resource to be viewed and/or changes made to the contents of the file system), a freeze may be placed on the First Hardware Resource 200 and/or affected applications, processes and/or accounts, while a combination of the above listed steps is used to migrate the affected applications, processes and/or accounts, until they are successfully configured, migrated and verified on the Second Hardware Resource 270.

As a non-limiting example, the Provisioning System 260 in the current invention may accomplish migration by selecting a Second Hardware Resource 270 from a pool of available hardware resources to migrate the "exampleaccount.com" account and IP 123.456.0 and any associated applications or processes. Appropriate software or processes may be loaded onto the Second Hardware Resource 270, and the software and system may be appropriately customized, configured and generally made ready for operation.

The Provisioning System 260 may then accept instructions for mapping the data to be migrated and the route/path on the Routing Table 250 from a First Hardware Resource 200 to a Second Hardware Resource 270. Data, applications and/or processes may then be extracted from the First Hardware Resource 200 and loaded onto the Second Hardware Resource 270 with the route being updated appropriately through static routing. The First Hardware Resource 200 may be frozen as described above during any portion of this migration.

The Provisioning System 260 may likewise instantiate and configure the IP Address 230 for migration. The IP Address 230 may then facilitate and allow data such as the Hosted Account 220 to move physical location seamlessly. The Routing Table 250 may then be updated to reflect the destination resource as the Second Hardware Resource 270. It should be noted in this example environment that any Domain Name System (DNS) entries would not be affected since the IP address 230 associated with the account has not changed.

Figure 3:
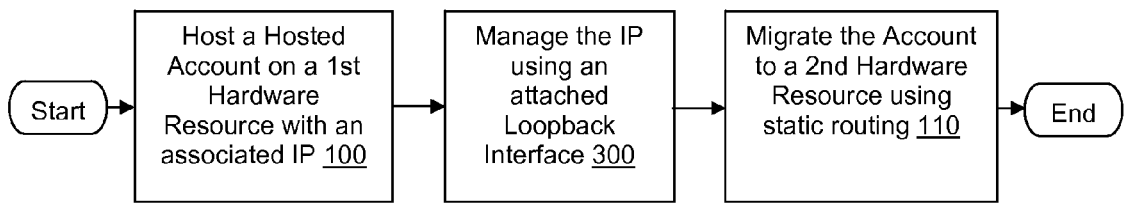
FIG. 3 is a flow diagram illustrating a possible embodiment including managing an IP address using an attached loopback interface.

An example embodiment shown in FIG. 3 shows that the step of managing the IP Address 230 using an attached Loopback Interface (Step 300) may be included.

Figure 4:
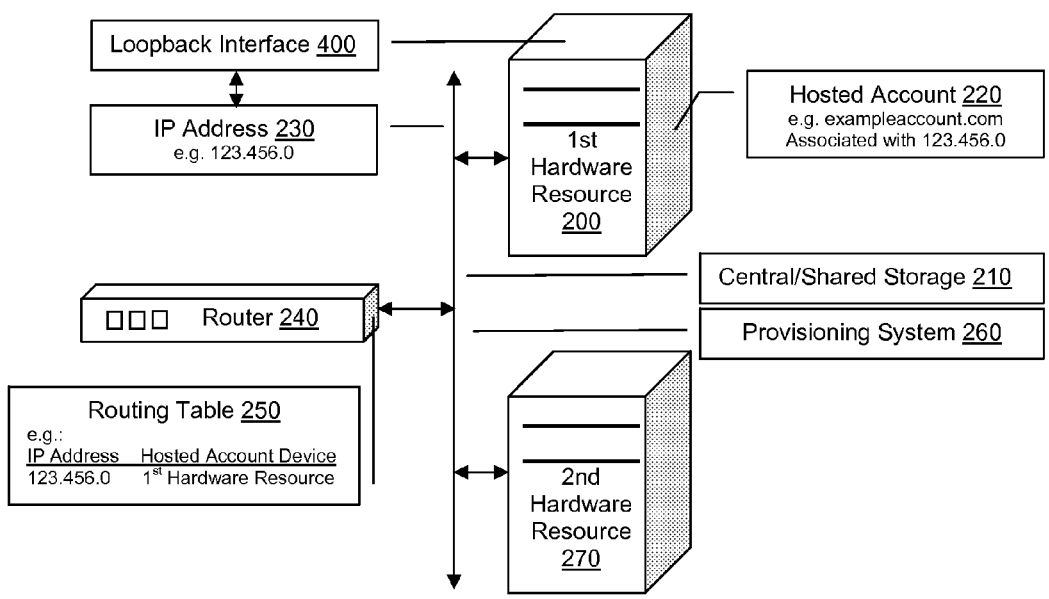
FIG. 4 illustrates a possible environment wherein a loopback interface may manage an IP address.

The Loopback Interface 400, seen in FIG. 4 may be a virtual interface used for management purposes. The Loopback Interface 400 may be assigned an address, in this example 123.456.0. This IP Address 230 may be accessed from management equipment, software or a control panel over a network, such as the example control panel interfaces seen in the example embodiments below. The Loopback Interface 400 may not be required to be assigned to any of the real interfaces on the device such as the First Hardware Resource 200, the Second Hardware Resource 270 or any other network resources.

Network components which use the Loopback Interface 400 may send or receive traffic using the address assigned to the virtual interface as opposed to the address on the physical interface through which the traffic passes. Network hardware resources may be configured with multiple physical network interfaces, or virtual network interfaces on the same physical interface.

Figure 5:
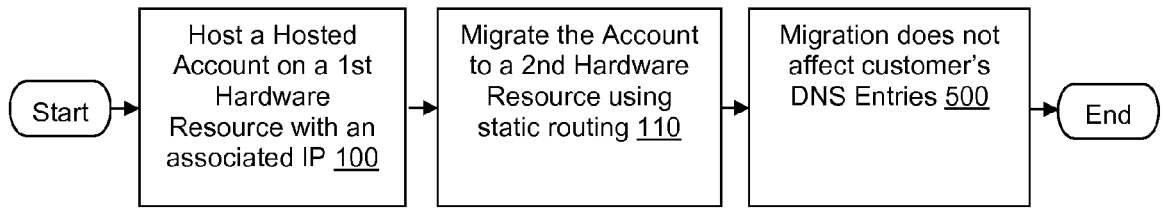
FIG. 5 is a flow diagram illustrating a possible embodiment including a customer's Domain Name Service (DNS) entries not being affected by the migration.

An example embodiment shown in FIGS. 5 and 6 shows that the step of using static routing to migrate the Hosted Account 220 and the IP Address 230 to a Second Hardware Resource 270 using static routing (Step 110) may be accomplished without affecting a DNS entry of a customer using the Hosted Account 220 (Step 500).

A customer using the Hosted Account 220 may be an individual or an entity including a person, a business, a governmental institution, an educational institution, a non-profit organization, or a social organization or any other individual or organization that may access and use the Hosted Account 220.

The DNS may distribute the responsibility for assigning domain names and may map them to IP networks by allowing an authoritative name server for each domain to keep track of its own changes. The DNS may be maintained by a distributed database system, which may use a client-server model. Static addressing may be, but is not necessarily used in some infrastructure situations, such as finding the DNS directory host that may translate domain names to IP addresses. Static addresses may also be used to locate servers inside the network environment.

The DNS may allow the assignment of domain names independent of a physical routing hierarchy represented by the numerical IP address. Because of this, hyperlinks and Internet contact information can remain the same, whatever the current IP routing arrangements may be. Thus the migration of the Hosted Account 220 and the IP Address 230 may be accomplished without the customer's DNS entries being affected.

Figures 7, 8:
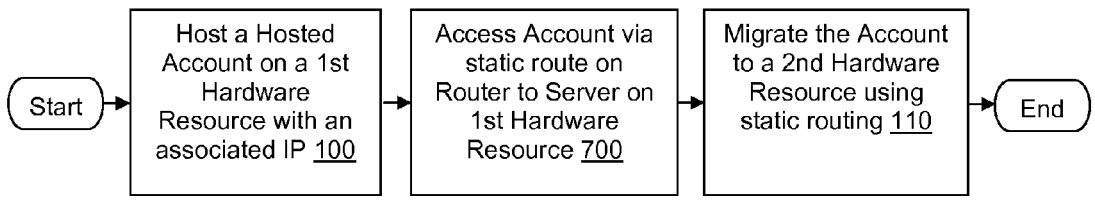
FIG. 7 is a flow diagram illustrating a possible embodiment including accessing the account via a static route on a router to a server on the first hardware resource.
FIG. 8 illustrates a possible embodiment of an interface for enabling a server to provide access to the account via static route placed on an upstream router.

An example embodiment shown in FIG. 7 shows that the step of hosting a Hosted Account 220 on a First Hardware Resource 200 (Step 100) may be followed by a step of the Server providing access to the Hosted Account 220 via a static route placed on the upstream Router 240 (Step 700).

FIG. 8 shows an example control panel interface that may be used together with the structure disclosed in FIGS. 2, 4, 6, 22 and 36 for network management of the current invention. This control panel interface may be a computer user interface that utilizes a control panel metaphor to allow the user control of software and hardware features, which may control network management, in this example.

The control panel may be accessible via any application or system including, but not limited to a computer, laptop, telephone, handheld device, etc. that may access and display a possibly remote service on a server or other computer system using a network, and may include additional stand-alone programs.

The user interface may be any graphical, textual and/or auditory information a computer program presents to the user, and the control sequences such as keystrokes, movements of the computer mouse, selections with a touch screen etc. used to control the program. The interface may further include viewing and editing capabilities.

Examples of such interfaces include any known or later developed combination of Graphical User Interfaces (GUI) or Web-based user interfaces, Touch interfaces, Conversational Interface Agents, Live User Interfaces (LUI), Command line interfaces, Non-command user interfaces, Object-oriented User Interfaces (OOUI) or Voice user interfaces.

Likewise, information may be input and displayed using methods other than that seen in the following example interfaces. An example interface may show information being entered from a drop-down list, but this or any other information could be accepted using any field, widget and/or control used in such interfaces, including but not limited to a textbox, text field, button, hyper-link, list, drop-down list, checkbox, radio button, data grid, icon, graphical image, embedded link, etc. The example interface in FIG. 8 and similar examples throughout this disclosure are not intended to and should not limit the scope of the disclosed invention.

For example, FIG. 8 shows an example user interface that may be displayed as a network management control panel and used together with the structure disclosed in FIGS. 2, 4, 6, 22 and 36. This interface, with the disclosed structure, may be used to enable the customer using the Hosted Account 220 to set the static route placed on the upstream Router 240 by identifying the First Hardware Resource 200 as the hardware resource and/or Server which provides access to the Hosted Account 220 and its associated IP Address 230 (Step 700).

An example embodiment shown in FIG. 9 shows that the step of using static routing to migrate the Hosted Account 220 and the IP Address 230 to a Second Hardware Resource 270 (Step 110) may be preceded by a step of establishing a Server on the Second Hardware Resource 270 (Step 900).

FIG. 10 shows an example user interface using the disclosed structure that may be used to establish a Server on the Second Hardware Resource 270 (Step 900). For example, a customer using Hosted Account 220 "exampleaccount.com" may use a series of drop-down lists to select a source First Hardware Resource 200 and destination Second Hardware Resource 270 to establish a Server on the Second Hardware Resource 270. After selecting the source and destination hardware resources, the customer may then perform any of the previously disclosed migration steps and update the configuration of hardware resources, possibly by clicking a button on the interface.

An example embodiment shown in FIG. 11 shows that the step of using static routing to migrate the Hosted Account 220 and the IP Address 230 to a Second Hardware Resource 270 (Step 110) may be preceded by a step of instantiating the IP Address 230 to be migrated to the Second Hardware Resource 270 (Step 1100).

FIG. 12 shows an example user interface using the disclosed structure which may be used to instantiate the IP Address 230 to be migrated to the Second Hardware Resource 270 (Step 1100). For example, a customer using "exampleaccount.com" may use the Provisioning System 260 to perform the creation of an instance of the IP 123.456.0 on the Second Hardware Resource 270.

In this example embodiment, the Provisioning System 260 may extrapolate information previously entered into the control panel interface by the customer to determine the IP Address 230 and the destination hardware resource on which to instantiate the IP Address 230. The customer may then perform any of the previously disclosed migration steps and confirm the instantiation of the IP Address 230, possibly by clicking a button on the interface.

An example embodiment shown in FIG. 13 shows that the step of using static routing to migrate the Hosted Account 220 and the IP Address 230 to a Second Hardware Resource 270 (Step 110) may preceded by a step of performing mounting and access checks for a Central/Shared Storage 210 associated with the IP Address 230 and the Hosted Account 220 (Step 1300).

FIG. 14 shows an example user interface using the disclosed structure which may be used to perform mounting and access checks for a Central/Shared Storage 210 associated with the IP Address 230 and the Hosted Account 220 (Step 1300). For example, the progress of both checks may be displayed as they are performed by the Provisioning System 260. At the completion, the customer using the Hosted Account 220 may then perform any of the previously disclosed migration steps and confirm completion of the mounting and access checks, possibly by clicking a button on the interface.

Figures 15, 16:
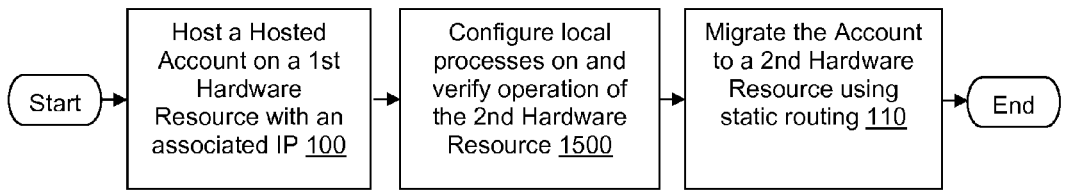
FIG. 15 is a flow diagram illustrating a possible embodiment including configuring local processes on and verifying proper operation of the second hardware resource.
FIG. 16 illustrates a possible embodiment of an interface for configuring local processes on and verifying proper operation of the second hardware resource.

An example embodiment shown in FIG. 15 shows that the step of using static routing to migrate the Hosted Account 220 and the IP Address 230 to a Second Hardware Resource 270 (Step 110) may be preceded by a step of configuring local processes on and verifying proper operation of the Second Hardware Resource 270 (Step 1500).

FIG. 16 shows an example user interface using the disclosed structure which may be used to configure local processes on and verify proper operation of the Second Hardware Resource 270 (Step 1500). For example, the progress of both the configuration and verification may be displayed as it is performed by the Provisioning System 260. At the completion, the customer using the Hosted Account 220 may then perform any of the previously disclosed migration steps and confirm completion of the configuration and verification, possibly by clicking a button on the interface.

Figure 17:
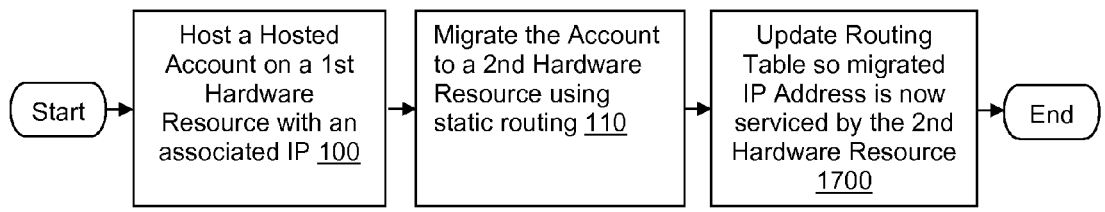
FIG. 17 is a flow diagram illustrating a possible embodiment including updating a routing table of an upstream router so the migrated IP is serviced by the second hardware resource.

An example embodiment shown in FIG. 17 shows that the step of using static routing to migrate the Hosted Account 220 and the IP Address 230 to a Second Hardware Resource 270 (Step 110) may be followed by a step of updating a Routing Table 250 on a Router 240 upstream so that the IP Address 230 migrated is serviced by the Second Hardware Resource 270, thereby accomplishing a route swing (Step 1700).

Figure 18:
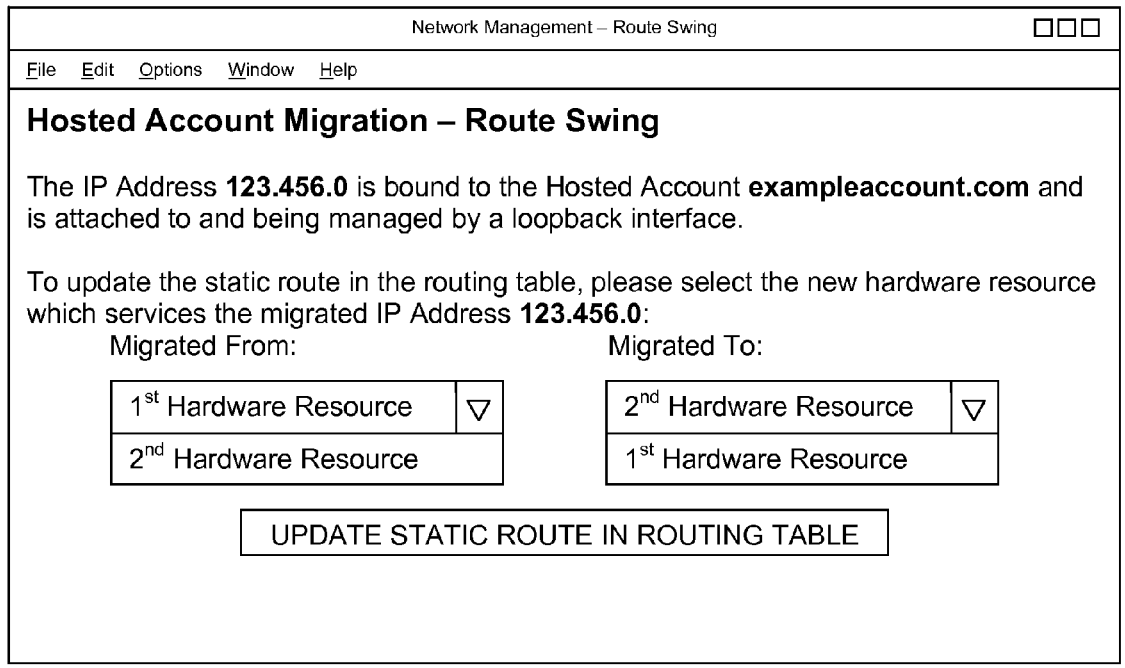
FIG. 18 illustrates a possible embodiment of an interface for updating a routing table of an upstream router so the migrated IP is serviced by the second hardware resource.

FIG. 18 shows an example user interface using the disclosed structure which may be used to update a Routing Table 250 on a Router 240 upstream using static routing so that the IP Address 230 migrated is serviced by the Second Hardware Resource 270, thereby accomplishing a route swing (Step 1700). For example, a customer using the Hosted Account 220 may select from drop-down menus a source First Hardware Resource 200 and a destination Second Hardware Resource 270. The static route may then be updated on the Routing Table 250 to accomplish the route swing (Step 1700). The customer may then perform any of the previously disclosed migration steps and confirm completion of the configuration and update the static route possibly by clicking a button on the interface.

Figure 19:
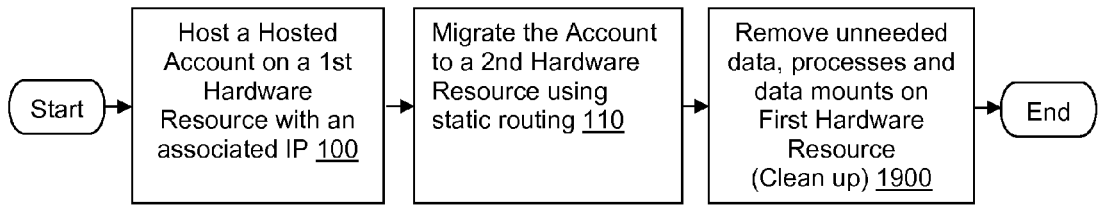
FIG. 19 is a flow diagram illustrating a possible embodiment including removing configuration data, processes and unneeded data mounts on the first hardware resource.

An example embodiment shown in FIG. 19 shows that the step of using static routing to migrate the Hosted Account 220 and the IP Address 230 to a Second Hardware Resource 270 (Step 110) may be followed by a step of removing configuration data, removing processes and removing unneeded data mounts on the First Hardware Resource 200 (Step 1900).

Figure 20:
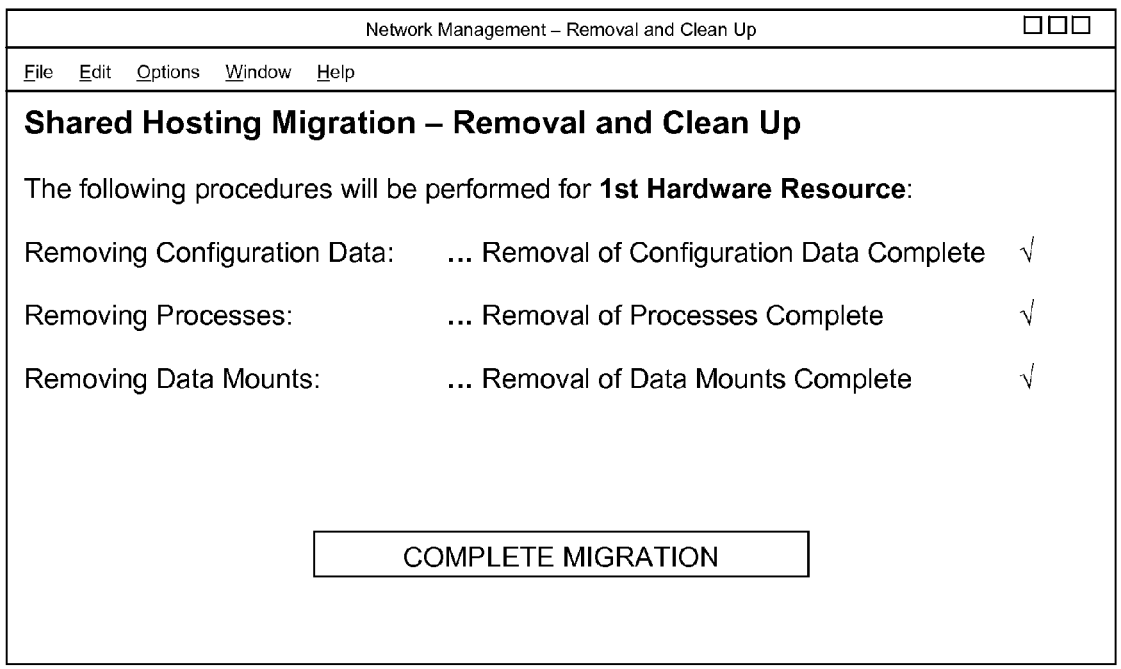
FIG. 20 illustrates a possible embodiment of an interface for removing configuration data, processes and unneeded data mounts on the first hardware resource.

FIG. 20 shows an example user interface using the disclosed structure which may be used to remove configuration data, processes and unneeded data mounts on the First Hardware Resource 200 (Step 1900). For example, the progress of the removal of configuration data, processes and unneeded data mounts on the First Hardware Resource 200 (Step 1900) may be displayed as it is performed by the Provisioning System 260. At the completion, the customer using the Hosted Account 220 may then perform any of the previously disclosed migration steps and confirm completion of the removal of configuration data, processes and unneeded data mounts, possibly by clicking a button on the interface.

A Method of Using Routing Protocols to Migrate a Shared Hosting Account

Figure 21:
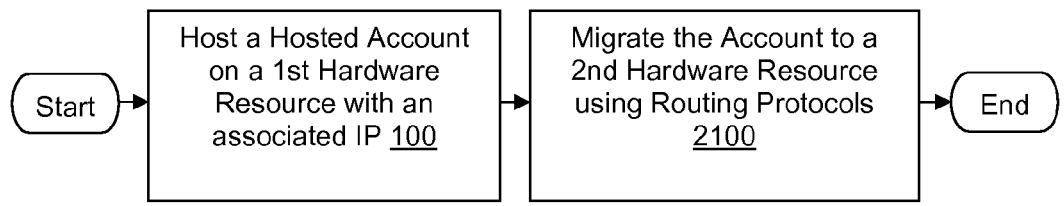
FIG. 21 is a flow diagram illustrating a possible embodiment of a method for using routing protocols to migrate a hosted account among shared resources.

Several different methods may be used to provide and manage the disclosed invention. In an example embodiment illustrated in FIG. 21, a Hosted Account 220 on a First Hardware Resource 200 may be associated with an IP Address 230 (Step 100). Routing Protocols may then be used to migrate the Hosted Account 220 and the associated IP Address 230 to a Second Hardware Resource (Step 2100).

A Routing Protocol may gather and share the routing information used to maintain and update routing tables. That routing information may in turn be used to route a routed protocol to its final destination. A Routing Protocol may also be a formula used by routers to determine the appropriate path onto which data should be forwarded and may specify how routers report changes and share information with other routers in a network that they can reach.

Unlike static routing where all routing decisions may be required to be predetermined and remain static, a routing protocol may allow the network to dynamically adjust to changing conditions. This may be accomplished via an announcement by the routing protocol to an upstream router that may be updated appropriately. A Routing Protocol may be used in a large network environment, since manual updating of the Router may not be required.

Routing Protocols may be divided into link-state Routing Protocols and distance vector Routing Protocols. A link-state protocol may use link-state routing so that every node constructs a map of the connectivity of the network, in the form of a graph showing which nodes are connected to which other nodes. Switching nodes, such as a router in the network, may perform the link-state protocol. Link-state routing may require each switching node in the network to send its information about its neighbors to the entire network.

Each node may then independently calculate the best next hop from it for every possible destination in the network, using only its local copy of the map, and without communicating with any other node. The collection of best next hops may form the routing table for the node. Examples of link-state protocols may include, but are not limited to Open Shortest Path First (OSPF) and Intermediate System to Intermediate System (IS-IS).

This may be contrasted with distance-vector Routing Protocols, which may work by having each node share its routing table with its neighbors to calculate paths using less computational complexity and message overhead. In a link-state protocol, the only information passed between the nodes may be information used to construct the connectivity maps. Examples of distance-vector Routing Protocols may include, but are not limited to Routing Information Protocol (RIP), Interior Gateway Routing Protocol (IGRP), Exterior Gateway Protocol (EGP) and Border Gateway Protocol (BGP).

Figure 22:
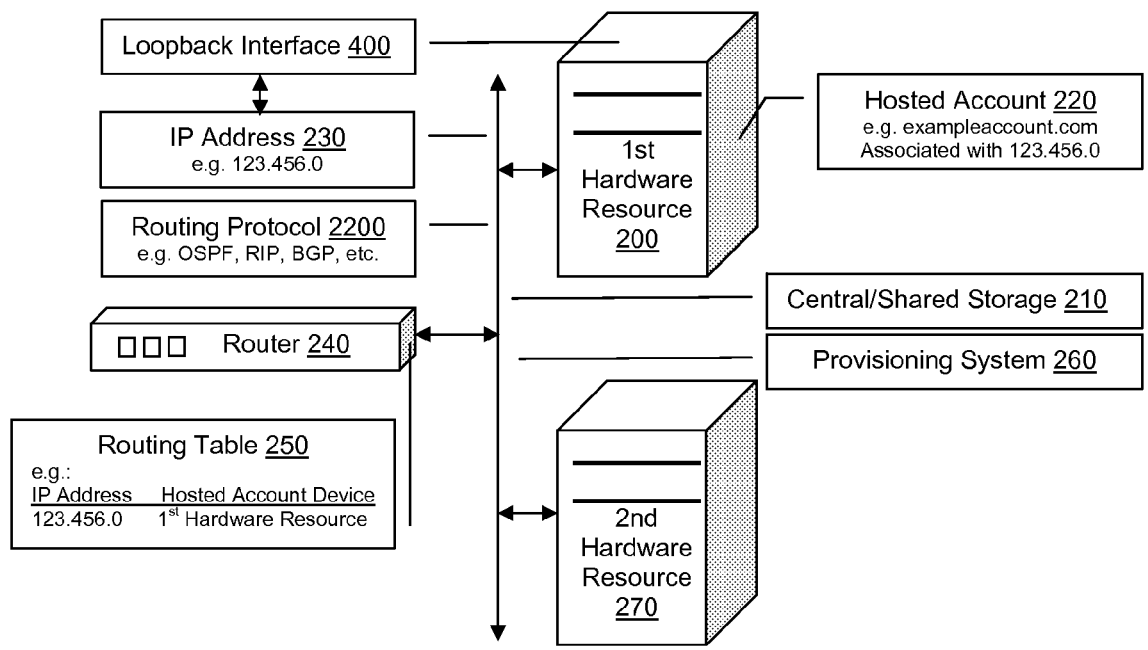
FIG. 22 illustrates a possible environment wherein a hosted account may be migrated among shared resources using routing protocols.

Several different environments may be used to complete the steps accomplished by the disclosed invention. FIG. 22 demonstrates a streamlined example of such an environment. A First Hardware Resource 200 and a Second Hardware Resource 270 may be, or may be used for applications and/or processes related to a Server, and may be part of a group of resources, possibly part of a server cluster serviced by a common Router 240. A Hosted Account 220 may be hosted using Server resources in addition to Central/Shared Storage 210. An IP Address 230 may be associated with the Hosted Account 220. A Routing Table 250 on a Router 240 may contain a route/path used to direct network traffic for the IP Address 230 to the Hosted Account 220. This Routing Table 250 may be sent dynamic announcements about the network using the Routing Protocol 2200.

A Provisioning System 260 may be used to assign the Hosted Account 220 to the IP Address 230. The Provisioning System may also migrate the Hosted Account 220 and its associated IP Address 230 from the First Hardware Resource 200 to a Second Hardware Resource 270 using a dynamic announcement of a Routing Protocol 2200 substantially as described above. This environment and its components, as described in more detail elsewhere in this disclosure, may provide the structure for various means for executing the steps involved in accomplishing the invention as disclosed.

This environment works on substantially the same principles as those disclosed regarding FIGS. 2, 4 and 6. However, the use of the Routing Protocol 2200 to send dynamic announcements to the upstream Router 240 introduces notable differences in the environment shown in FIG. 22.

Specifically, rather than using a static route, data may be extracted from the First Hardware Resource 200 and loaded onto the Second Hardware Resource 270 with the route being determined via an announcement by the Routing Protocol 2200 to an upstream Router 240 and updating the Routing Table 250 on the upstream Router 240 appropriately. Similarly, rather than using a static route, access to the Hosted Account 220 may be accomplished via an announcement by the routing protocol to an upstream Router 240 and the Routing Table 250 on the upstream Router 240 may be updated appropriately using the Routing Protocol 2200. This environment may also include an autonomous system and reside within a VLAN environment as previously described.

Figure 23:
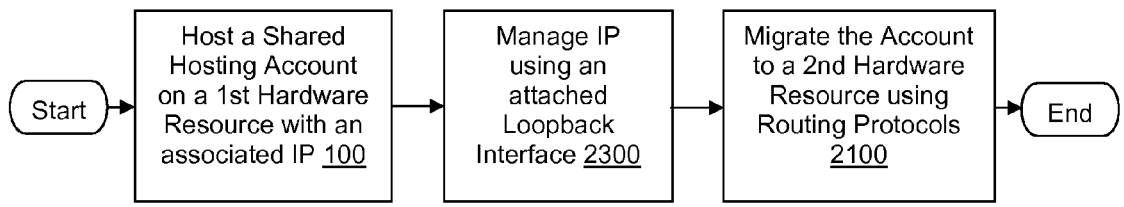
FIG. 23 is a flow diagram illustrating a possible embodiment including managing an IP address using an attached loopback interface.

An example embodiment shown in FIG. 23 shows that the step of managing the associated IP Address 230 using an attached Loopback Interface 400 (Step 2300) as previously disclosed may be included in an environment in which Routing Protocols 2200 are used to migrate the Hosted Account 220 to the Second Hardware Resource 270 (Step 2100).

Figure 24:
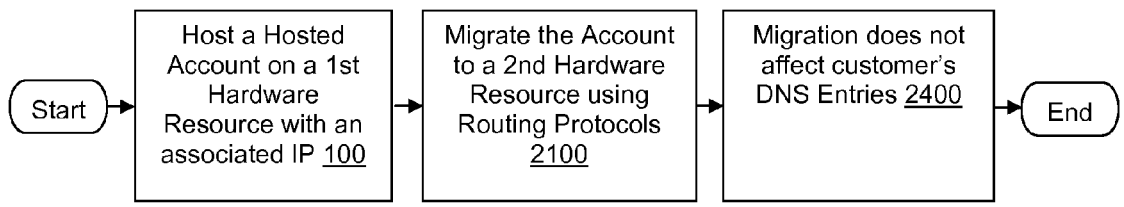
FIG. 24 is a flow diagram illustrating a possible embodiment including a user's DNS entries not being affected by the migration.

An example embodiment shown in FIG. 24 shows that the step of using a Routing Protocol 2200 to migrate the Hosted Account 220 and the IP Address 230 to a Second Hardware Resource 270 (Step 2100) may be accomplished without affecting a DNS entry of a customer using the Hosted Account 220 (Step 2400) substantially similar to that previously disclosed regarding FIG. 6.

An example embodiment shown in FIG. 25 shows that the step of hosting a Hosted Account 220 on a First Hardware Resource 200 (Step 100) may be followed by a step of the Server providing access to the Hosted Account 220 via a dynamic announcement to a Router 240 upstream from the Server (Step 2500).

FIG. 26 shows an example user interface using the disclosed structure which may be used to enable the customer using the Hosted Account 220 to send a dynamic announcement to the upstream Router 240 by identifying the First Hardware Resource 200 as the hardware resource and/or Server which provides access to the Hosted Account 220 and its associated IP Address 230 (Step 2500).

Figure 27:
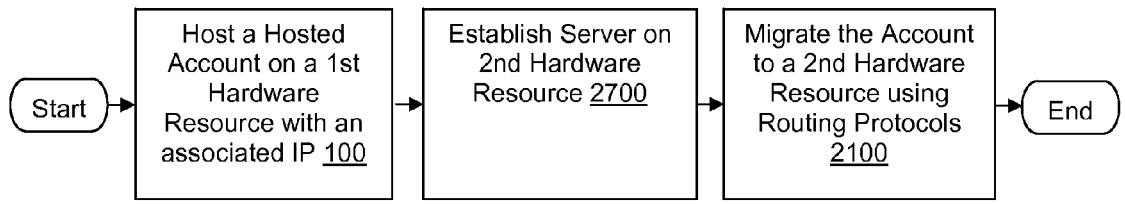
FIG. 27 is a flow diagram illustrating a possible embodiment including establishing a server on a hardware resource.

An example embodiment shown in FIG. 27 shows that the step of using a Routing Protocol 2200 to migrate the Hosted Account 220 and the IP Address 230 to a Second Hardware Resource 270 (Step 2100) may be preceded by a step of establishing a Server on the Second Hardware Resource 270 (Step 2700). An interface substantially similar to that shown in FIG. 10 and described in detail elsewhere in this application may be used to accomplish this step.

Figure 28:
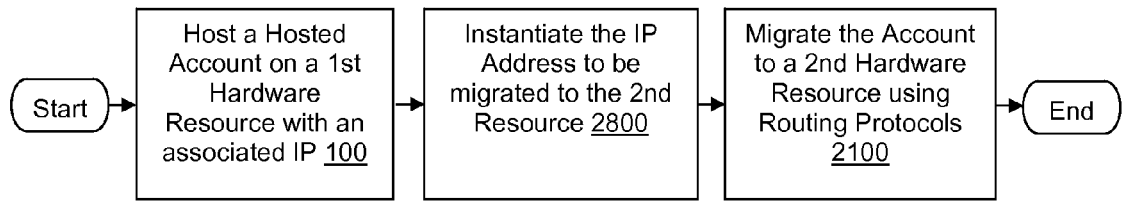
FIG. 28 is a flow diagram illustrating a possible embodiment including instantiating the IP address to be migrated to the second resource.

An example embodiment shown in FIG. 28 shows that the step of using a Routing Protocol 2200 to migrate the Hosted Account 220 and the IP Address 230 to a Second Hardware Resource 270 (Step 2100) may preceded by a step of instantiating the IP Address 230 to be migrated to the Second Hardware Resource 270 (Step 2800). An interface substantially similar to that shown in FIG. 12 and described in detail elsewhere in this application may be used to accomplish this step.

Figure 29:
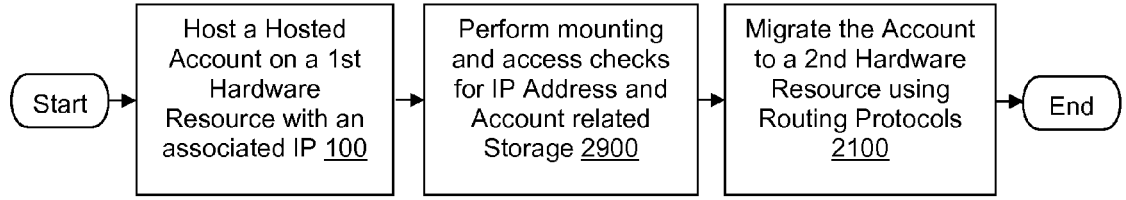
FIG. 29 is a flow diagram illustrating a possible embodiment including performing mounting and access checks for shared storage associated with hosted accounts.

An example embodiment shown in FIG. 29 shows that the step of using a Routing Protocol 2200 to migrate the Hosted Account 220 and the IP Address 230 to a Second Hardware Resource 270 (Step 2100) may be preceded by a step of performing mounting and access checks for a Shared Storage 210 associated with the IP Address 230 and the Hosted Account 220 (Step 2900). An interface substantially similar to that shown in FIG. 14 and described in detail elsewhere in this application may be used to accomplish this step.

Figure 30:
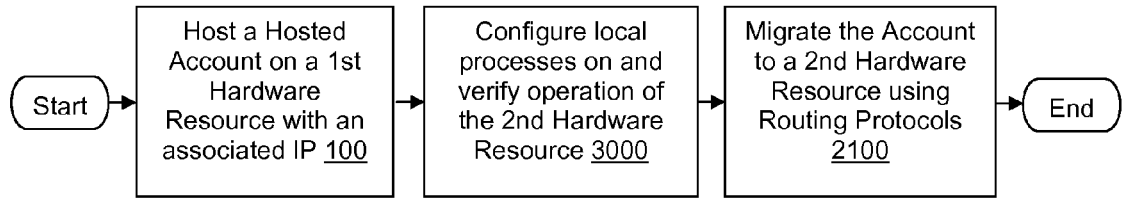
FIG. 30 is a flow diagram illustrating a possible embodiment including configuring local processes on and verifying proper operation of the second hardware resource.

An example embodiment shown in FIG. 30 shows that the step of migrating the Hosted Account 220 and the IP Address 230 to a Second Hardware Resource 270 using a Routing Protocol 2200 (Step 2100) may be preceded by a steps of configuring local processes on and verifying proper operation of the New Hardware Resource 270 (Step 3000). An interface substantially similar to that shown in FIG. 16 and described in detail elsewhere in this application may be used to accomplish this step.

Figure 31:
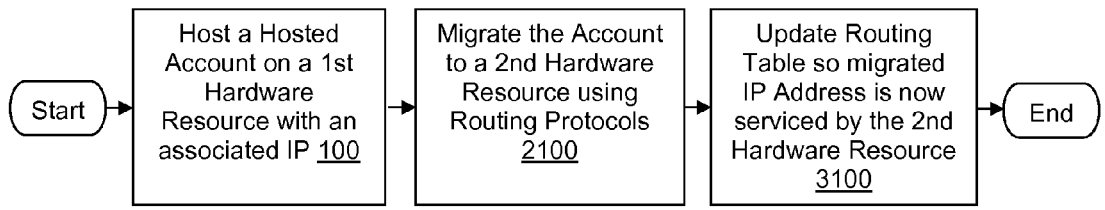
FIG. 31 is a flow diagram illustrating a possible embodiment including updating a routing table of an upstream router so the migrated IP is serviced by the second hardware resource.

An example embodiment shown in FIG. 31 shows that the step of using a Routing Protocol 2200 to migrate the Hosted Account 220 and the IP Address 230 to a Second Hardware Resource 270 (Step 2100) may be followed by a step of updating a Routing Table 250 on the upstream Router 240 using the Routing Protocol 2200 so that the IP Address 230 migrated is serviced by the Second Hardware Resource 270, thereby accomplishing a route swing (Step 3100).

Figure 32:
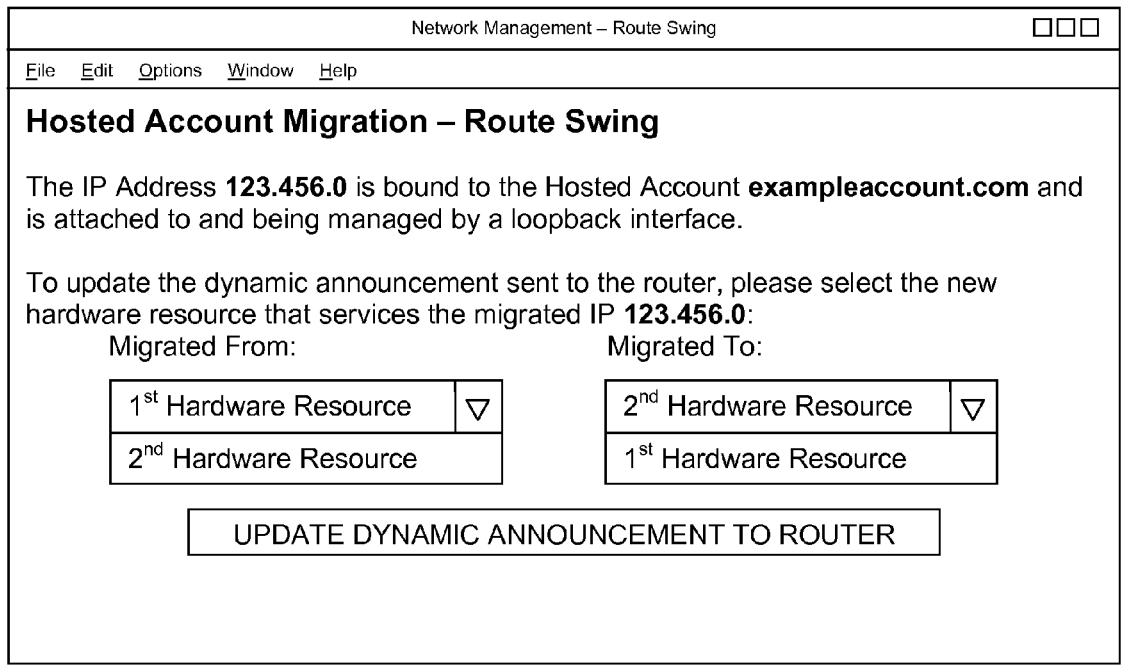
FIG. 32 illustrates a possible embodiment of an interface for updating a routing table of an upstream router so the migrated IP is serviced by the second hardware resource.

FIG. 32 shows an example user interface using the disclosed structure that may be used to update a Routing Table 250 on a Router 240 upstream using the Routing Protocol 2200 so that the IP Address 230 migrated is serviced by the Second Hardware Resource 270, thereby accomplishing a route swing (Step 3100). For example, a customer using the Hosted Account 220 may select from drop-down menus a source First Hardware Resource 200 and a destination Second Hardware Resource 270. The dynamic announcement may then be sent to update the Routing Table 250 on the Router 240 to accomplish the route swing (Step 3100). The customer may then perform any of the previously disclosed migration steps and confirm completion of the configuration and updated dynamic announcement to the Router 240 possibly by clicking a button on the interface.

An example embodiment shown in FIG. 33 shows that the step of using a Routing Protocol to migrate the Hosted Account 220 and the IP Address 230 to a Second Hardware Resource 270 (Step 2100) may be followed by the steps of removing configuration data, removing processes, removing unneeded data mounts and removing a dynamic announcement to the Router 240 upstream from the First Hardware Resource 200 (Step 3300).

FIG. 34 shows an example user interface using the disclosed structure that may be used to remove configuration data, processes and unneeded data mounts on the First Hardware Resource 200 (Step 3300). For example, the progress of the removal of configuration data, processes, unneeded data mounts and dynamic announcement on the First Hardware Resource 200 (Step 3300) may be displayed as the Provisioning System 260 performs it. At the completion, the customer using the Hosted Account 220 may then perform any of the previously disclosed migration steps and confirm completion of the removal of configuration data, processes, unneeded data mounts and dynamic announcement, possibly by clicking a button on the interface.

A Method of Using Static Routine to Optimize Resource Utilization

Figure 35:
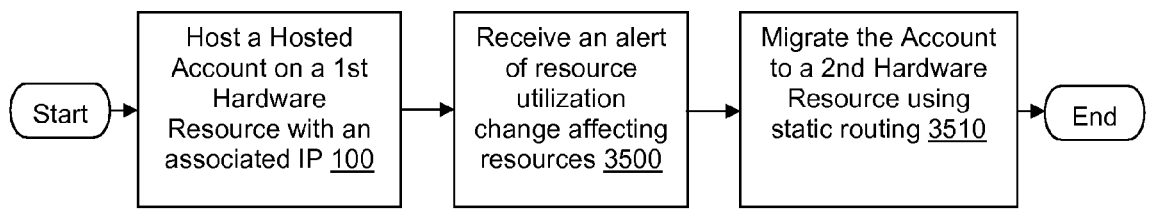
FIG. 35 is a flow diagram illustrating a possible embodiment of a method for using static routing to balance resources in response to resource utilization changes.

Several different methods may be used to provide and manage the disclosed invention. In an example embodiment illustrated in FIG. 35, a Hosted Account 220 may be hosted on a First Hardware Resource 200 within a group of resources. The Hosted Account 220 may be associated with an IP Address 230 (Step 100). An alert of a network resource utilization change affecting the group of resources may be received (Step 3500). Static routing may then be used to migrate the Hosted Account 220 and the IP Address 230 to a Second Hardware Resource 270 in response to the network resource utilization change (Step 3510).

Figure 36:
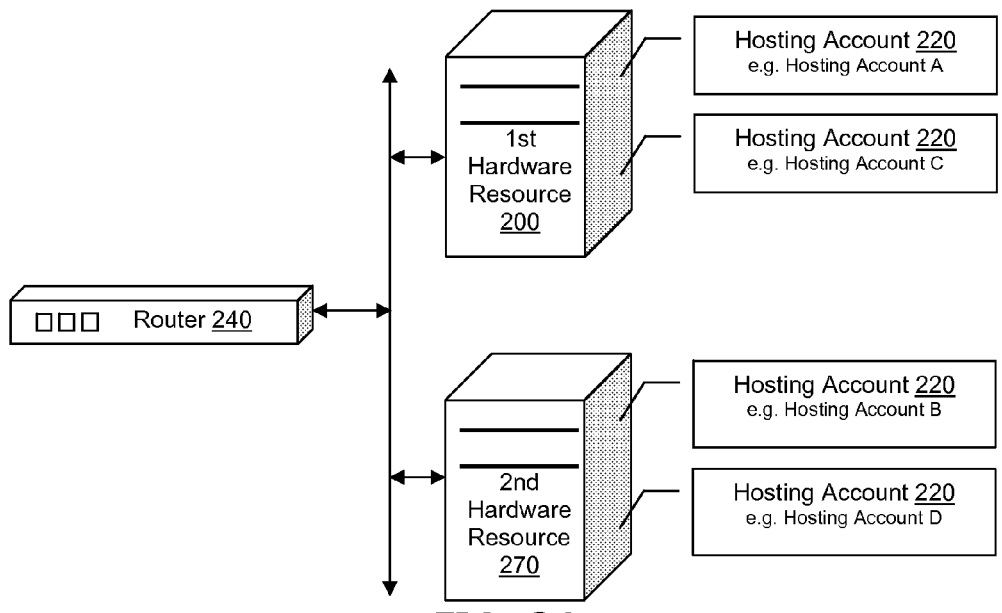
FIG. 36 illustrates a possible environment wherein a route change may be used to balance resources in response to resource utilization changes.

Several different environments may be used to complete the steps accomplished by the disclosed invention. FIG. 36 demonstrates a streamlined example of such an environment. A First Hardware Resource 200 and a Second Hardware Resource 270 may be, or may be used for applications and/or processes related to a Server, and may be part of a group of resources, possibly part of a server cluster serviced by a common Router 240. A group of Hosted Accounts 220 may be hosted using the Server resources.

In the interest of simplifying the current environment for example purposes, additional components of the environment shown and described in relation to FIGS. 2, 4, 6 and 22 are not shown in FIG. 36, but may be included. For example, an IP Address 230 may be associated with each of the Hosted Accounts 220. A Routing Table 250 on the Router 240 may contain a route/path used to direct network traffic for the IP Address 230 to the Hosted Account 220.

A Provisioning System 260 may be used to assign the Hosted Account 220 to the IP Address 230. The Provisioning System 260 may also migrate the Hosted Account 220 and its associated IP Address 230 from the First Hardware Resource 200 to a Second Hardware Resource 270 and back using static routing. This environment and its components, as described in detail elsewhere in this disclosure, may provide the structure for various means for executing the steps involved in accomplishing the invention as disclosed.

As in previously disclosed environments, this environment may also include an autonomous system and/or may reside within a Virtual Local Area Network (VLAN) environment as previously disclosed.

The Loopback Interface 400 previously disclosed may also be used for management datagrams, such as alarms, originating from the network resources, which may be used to facilitate the alert of network resource utilization changes affecting the group of resources. The IP Address 230 may likewise be used to facilitate alerts of network resource utilization changes such as fault tolerance and load distribution.

A metric may be used to determine a threshold at which an alert is used to show a network resource utilization change. In the steady state, the Server may provide access to the Hosted Account 220 that may be bound to the IP Address 230. The alert may be triggered when the state is no longer a steady state, possibly an overload state.

A metric may be any variable assigned to network resources as a means of ranking them from best to worst or from most preferred to least preferred. The Router 240 may have and/or be used as part of the mechanism for calculating a best resource to be used when there are multiple available resources. Such metrics may also be used to determine when a migration to another hardware resource is recommended, and which hardware resource is preferred.

For example, any combination of disclosed software and hardware resources such as, but not limited to the Loopback Interface 400, IP Address 230 and Router 240 may determine a steady state threshold through monitored metrics which trigger an alert of a network resource utilization change related to Account C, hosted on First Hardware Resource 200 as shown in FIG. 36, and its associated IP Address 230. The network resource utilization change alert may be displayed to a customer who may automatically or manually migrate Account C and its associated IP Address 230 to the Second Hardware Resource 270 using static routing to update the route in the Routing Table 250 (Step 3510).

Figure 37:
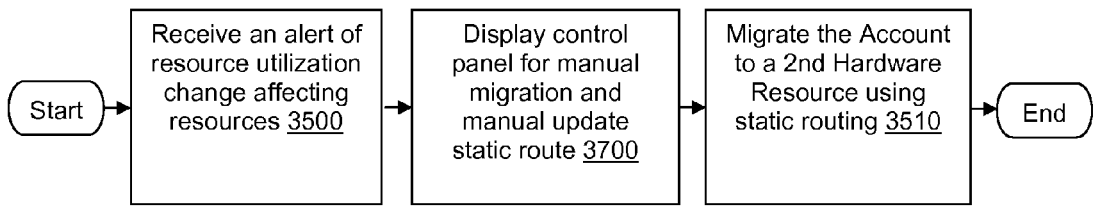
FIG. 37 is a flow diagram illustrating a possible embodiment including allowing a user to manually migrate the account using a control panel.

An example embodiment shown in FIG. 37 shows that the step of using static routing to migrate the Hosted Account 220 and the IP Address 230 to a Second Hardware Resource 270 in response to the network resource utilization change (Step 3510) may be preceded by a step providing a control panel for a manual migration of the Hosted Account 220 and manually updating a static route on a Router 240 upstream from the group of resources (Step 3700).

Figure 38:
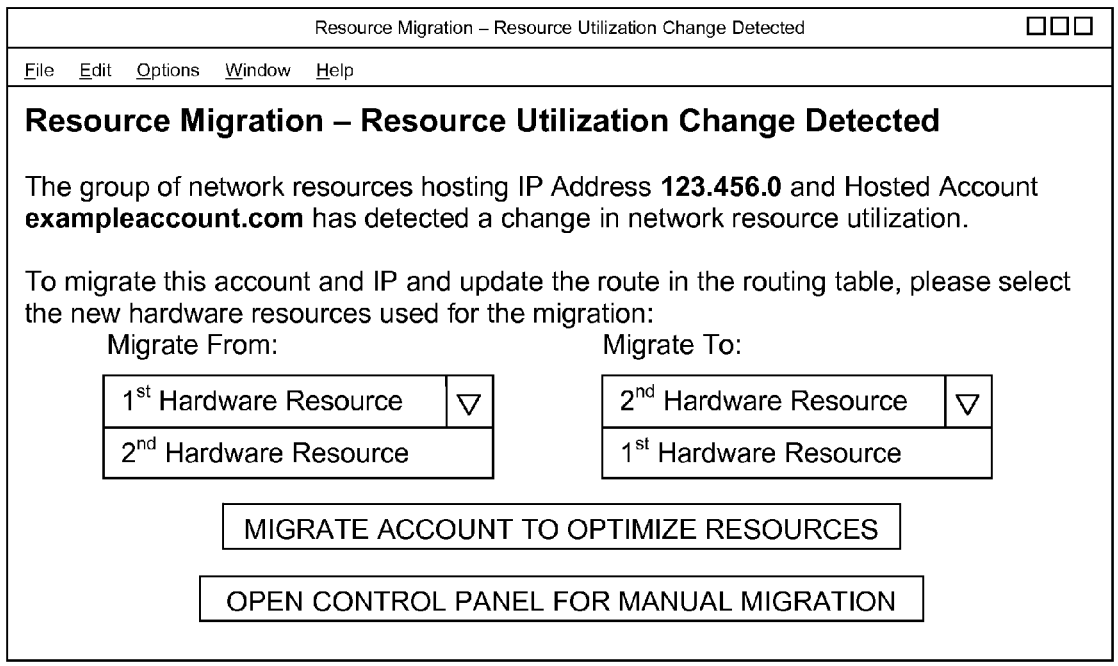
FIG. 38 illustrates a possible embodiment of an interface for allowing a user to manually migrate the account using a control panel.

FIG. 38 shows an example user interface using the disclosed structure which may be used to receive an alert of a network resource utilization change affecting the group of resources (Step 3500) and use static routing to migrate the Hosted Account 220 and the IP Address 230 to a Second Hardware Resource 270 in response to the network resource utilization change (Step 3510).

The example interface shown in FIG. 38 shows that many combinations of steps may be used to automatically or manually migrate the Hosted Account 220 and the IP Address 230 to a Second Hardware Resource 270 in response to the network resource utilization change (Step 3510). The system may automatically calculate the best distribution of resources and the best migration strategy for such a distribution. Likewise, the system may automatically migrate the Hosted Account 220 and IP Address 230 (Step 3510) according to the best-calculated migration and distribution strategy.

To accomplish such a strategy, a customer using the example interface shown in FIG. 38 may only need to push the button to calculate the best migration and distribution strategy and confirm automatic migration of the Hosted Account 220 and the IP Address 230 to a Second Hardware Resource 270 in response to the network resource utilization change (Step 3510). Similarly, the system may detect, calculate and apply such a migration and distribution strategy without user input.

Another use of the interface in FIG. 38 may include selecting the hardware resources to be used in such a migration, possibly using provided drop-down menus, and confirming whether this is the best migration and distribution strategy by clicking a provided button.

A button may also be provided which allows the customer using the Hosted Account 220 to open a control panel to migrate the Hosted Account 220 and Shared Hosting IP Account 230 manually in combination with updating the static route on a Routing Table 250.

The control panel may be any control panel disclosed in the current specification which allows the migration of the Hosted Account 220 and the IP Address 230 to be migrated between hardware resources using Routing Protocols 2200, or in combination with any migration control panel disclosed, known or later developed in the art. Likewise, the migration itself in step 3510 may be accomplished using any method for migration using static routing disclosed in the current specification.

Figures 39, 40:
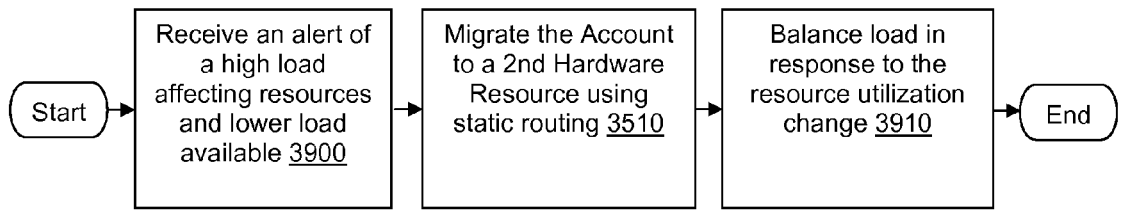
FIG. 39 is a flow diagram illustrating a possible embodiment including performing load balancing in response to high load and lower load available.
FIG. 40 illustrates a possible embodiment of an interface for performing load balancing in response to high load and lower load available.

An embodiment shown in FIG. 39 shows that the step of receiving an alert of a network resource utilization change affecting the group of resources (Step 3500) may be modified to include the step of showing a high load and a lower load configuration available (Step 3900), and that the step of using static routing to migrate the Hosted Account 220 and the IP Address 230 to a Second Hardware Resource 270 in response to the network resource utilization change (Step 3510) may be followed by the step of performing load balancing in response to the network resource utilization change (Step 3910).

Load balancing may include the practice of distributing traffic among multiple resources in order to use bandwidth efficiently. Load balancing may be implemented to alternate or distribute traffic between the multiple resources. The high load alert may be a metric that reflects a high amount of traffic utilizing a resource in a group of resources. The best configuration may then be reflected in the one with the lowest load or load distribution.

As a non-limiting example, FIG. 36 shows a streamlined configuration with a group of hardware resources including a First Hardware Resource 200 and a Second Hardware Resource 270 communicatively coupled to a Router 240. The First Hardware Resource 200 may host 2 Hosted Accounts 220, Account A and Account C, and the Second Hardware Resource 270 may host 2 accounts Account B and Account D.

The system may determine a high load on the First Hardware Resource 200 and determine that the load may be balanced by automatically or manually migrating Account C to the Second Hardware Resource 220 using disclosed methods for such migration using static routing.

FIG. 40 shows an example user interface using the disclosed structure which may be used to perform load balancing in response to the network resource utilization change (Step 3910) including an alert of a high load and a lower load configuration available (Step 3900), which may be displayed to a customer, who may migrate the Hosted Account 220 and IP Address 230 and update the route in the Routing Table 250. This may be accomplished using drop-down menus to select the First Hardware Resource 200 as the source and the Second Hardware Resource 270 as the destination for the migration. The customer may then migrate the Hosted Account 220 and IP Address 230 to optimize and balance the load, possibly by clicking a button on the interface.

As shown in FIG. 40, the Provisioning System 260 may use metrics from any combination of disclosed network software and hardware resources such as, but not limited to the Loopback Interface 400, IP Address 230 and Router 240 to determine the optimal parameters for load balancing, or any other available remedies for the detected network resource utilization change. A button may be available on the user interface to determine and apply such parameters automatically or manually. This may likewise be applied to any other network resource utilization change or available remedies for metrics showing variance from steady state.

Several different approaches may be used to balance the available resources. One such approach may allow the Hosted Account 220 to be migrated to accomplish equalization of the load on the group of resources. As a non-limiting example seen in FIG. 40, Account C may be automatically or manually migrated to the Second Hardware Resource 270 where the First Hardware Resource 200 may be using 90% of its resources affecting load and the Second Hardware Resource may using 30% of its resources affecting load.

In this example, the migration may accomplish use of 60% of the resources affecting load for the First Hardware Resource 200 and 60% of resources affecting load for the Second Hardware Resource 270. If the system determines such a scenario, manual or automatic migration using static routing may accomplish equalization of the load on the group of resources.

In another example approach, the First Hardware Resource 200 may have the highest load among the group of resources, the Second Hardware Resource 270 may have the lowest load among the group of resources and the Hosted Account 220 may be migrated using static routing from the First Hardware Resource 200 to the Second Hardware Resource 270 to balance the load.

For example, Account C may be migrated to the Second Hardware Resource 270 when it is detected that the highest use of resources affecting load is on the First Hardware Resource, and the migration of Account C may be used to balance the load. Such an approach may be used to temporarily balance the load. If the use of load-related resources on the First Hardware Resource 200 is reduced at some point after the migration, the Hosted Account 220 may be migrated back to the First Hardware Resource 200 when the high load on the First Hardware Resource 200 has been reduced to better accommodate the Hosted Account 220.

A Method Using Routine Protocols to Optimize Resource Utilization

Figure 41:
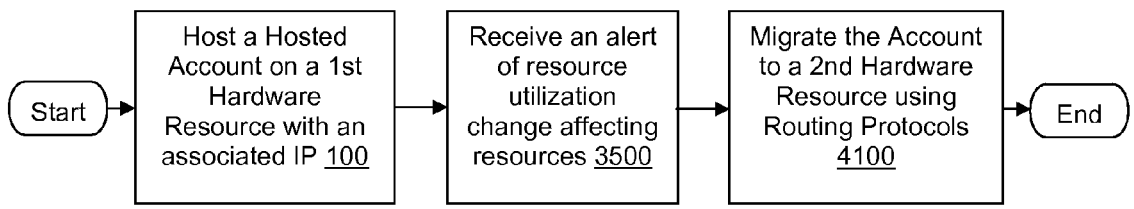
FIG. 41 is a flow diagram illustrating a possible embodiment of a method for using Routing Protocols to balance resources in response to resource utilization changes.

Several different methods may be used to provide and manage the disclosed invention. In an example embodiment illustrated in FIG. 41, a Hosted Account 220 may be hosted on a First Hardware Resource 200 within a group of resources. The Hosted Account 220 may be associated with an IP Address 230 (Step 100). An alert of a network resource utilization change affecting the group of resources may be received (Step 3500). A Routing Protocol 2200 may then be used to migrate the Hosted Account 220 and the IP Address 230 to a Second Hardware Resource 270 in response to the network resource utilization change (Step 4100).

Several different environments may be used to complete the steps accomplished by the disclosed invention. The environment shown in FIG. 36 and described elsewhere in this disclosure demonstrates a streamlined example of such an environment.

This environment works on substantially the same principles as those disclosed regarding FIG. 2 and subsequent like environments. However, the use of a Routing Protocol 2200 (not shown in FIG. 36) to send dynamic announcements to the upstream Router 240 introduces notable differences in the environment described in FIG. 36.

Specifically, rather than using a static route, data may be extracted from the First Hardware Resource 200 and loaded onto the Second Hardware Resource 270 with the route being determined via an announcement by the Routing Protocol 2200 to a Router 240 upstream from the group of resources and updating the Routing Table 250 on the upstream Router 240 appropriately. Similarly, rather than using a static route, access to the Hosted Account 220 may be accomplished via an announcement by the routing protocol to an upstream Router 240 and the Routing Table 250 on the upstream Router 240 may be updated appropriately using the Routing Protocol 2200. This environment may also include an autonomous system and reside within a VLAN environment as previously described.

As in the example environment shown in FIG. 36, the Loopback Interface 400 may be used in conjunction with other network resources and monitored metrics to facilitate the alert of network resource utilization changes affecting the group of resources.

For example, any combination of disclosed software and hardware resources such as, but not limited to the Loopback Interface 400, IP Address 230 and Router 240 may determine a steady state threshold through monitored metrics which trigger an alert of a network resource utilization change related to Account C, hosted on First Hardware Resource 200 as shown in FIG. 36, and its associated IP Address 230. The network resource utilization change alert may be displayed to a customer who may automatically or manually migrate Account C and its associated IP Address 230 to the Second Hardware Resource 270 using a Routing Protocol 2200 to update the route in the Routing Table 250 (Step 4100).

Figure 42:
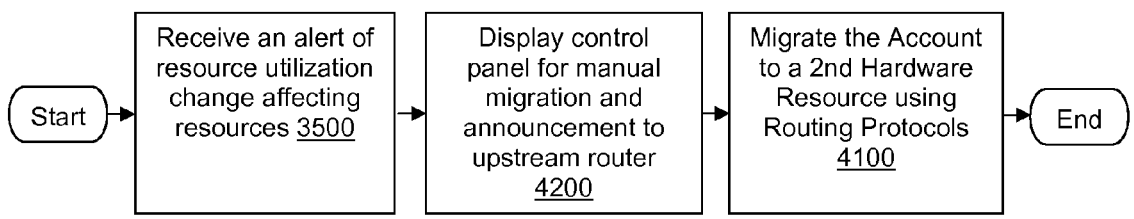
FIG. 42 is a flow diagram illustrating a possible embodiment including allowing a user to manually migrate the account using a control panel.

An example embodiment shown in FIG. 42 shows that the step of using a Routing Protocol 2200 to migrate the Hosted Account 220 and the IP Address 230 to a Second Hardware Resource 270 in response to the network resource utilization change (Step 4100) may be preceded by a step providing a control panel for a manual migration of the Hosted Account 220 and manually updating a dynamic announcement sent to a Router upstream from a Server on a Router 240 upstream from the group of resources. (Step 4200). An interface substantially similar to that shown in FIG. 38 and described in detail elsewhere in this application may be used to accomplish this step.

Figure 43:
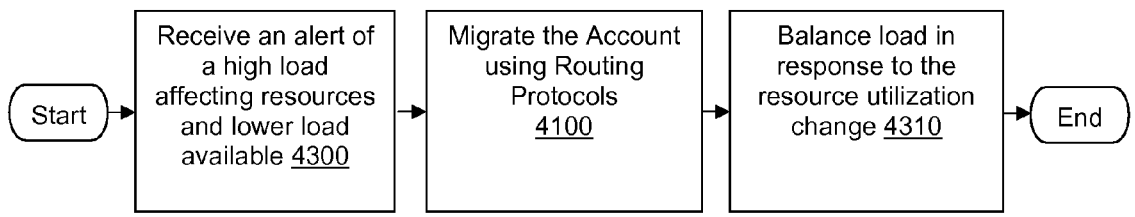
FIG. 43 is a flow diagram illustrating a possible embodiment including performing load balancing in response to high load and lower load available.

An embodiment shown in FIG. 43 shows that the step of receiving an alert of a network resource utilization change affecting the group of resources (Step 3500) may be modified to include the step of showing a high load and a lower load configuration available (Step 4300), and that the step of using a Routing Protocol 2200 to migrate the Hosted Account 220 and the IP Address 230 to a Second Hardware Resource 270 in response to the network resource utilization change (Step 4100) may be followed by the step of performing load balancing in response to the network resource utilization change (Step 4310). An interface substantially similar to that shown in FIG. 40 and described in detail elsewhere in this application may be used to accomplish these steps.

As a non-limiting example, FIG. 36 shows a streamlined configuration with a group of hardware resources including a First Hardware Resource 200 and a Second Hardware Resource 270 communicatively coupled to a Router 240. The First Hardware Resource 200 may host 2 Hosted Accounts 220, Account A and Account C, and the Second Hardware Resource 270 may host 2 accounts Account B and Account D.

The system may determine a high load on the First Hardware Resource 200 and determine that the load may be balanced by automatically or manually migrating Account C to the Second Hardware Resource 220 using disclosed methods for such migration using a Routing Protocol 2200.

Several different approaches may be used to balance the available resources. One such approach may allow the Hosted Account 220 to be migrated to accomplish equalization of the load on the group of resources. As a non-limiting example, Account C may be automatically or manually migrated to the Second Hardware Resource 270 as seen in FIG. 40 where the First Hardware Resource 200 may be using 90% of its resources affecting load and the Second Hardware Resource may using 30% of its resources affecting load.

In this example, the migration may accomplish use of 60% of the resources affecting load for the First Hardware Resource 200 and 60% of resources affecting load for the Second Hardware Resource 270. If the system determines such a scenario, manual or automatic migration using Routing Protocols 2200 may accomplish equalization of the load on the group of resources.

In another example approach, the First Hardware Resource 200 may have the highest load among the group of resources, the Second Hardware Resource 270 may have the lowest load among the group of resources and the Hosted Account 220 may be migrated using Routing Protocols 2200 from the First Hardware Resource 200 to the Second Hardware Resource 270 to balance the load.

For example, Account C may be migrated to the Second Hardware Resource 270 when it is detected that the highest use of resources affecting load is on the First Hardware Resource, and the migration of Account C may be used to balance the load. Such an approach may be used to temporarily balance the load. If the use of load-related resources on the First Hardware Resource 200 is reduced at some point after the migration, the Hosted Account 220 may be migrated back to the First Hardware Resource 200 when the high load on the First Hardware Resource 200 has been reduced to better accommodate the Hosted Account 220. Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A method comprising the steps of:
A) binding, by one or more server computers in a server cluster communicatively coupled to a network, an Internet Protocol (IP) address to a website hosted on a source server computer within said server cluster;
B) assigning, by said one or more server computers, said IP address to a loopback interface without binding said IP address to a physical network interface on said source server computer;
C) transmitting, by said one or more server computers, to a router servicing said server cluster, via a routing protocol, a dynamic announcement, from said source server computer, of a network path to said IP address via said loopback interface, wherein, responsive to receiving said dynamic announcement, said router updates a routing table stored in said router to reflect said network path to said IP address via said loopback interface on said source server computer;
D) monitoring, by said one or more server computers, via a plurality of metrics from said router, said loopback interface and said IP address, a steady state of a network resource utilization by said website on said source server computer;
E) responsive to said plurality of metrics reaching an overload state outside of said steady state, generating, by said one or more server computers, an alert of said overload state
E) responsive to said alert, migrating, by said one or more server computers, said website, said IP address and said loopback interface to said destination server computer without requiring an update of one or more Domain Name System (DNS) entries for said website; and
F) responsive to said alert, identifying a destination server computer within said server cluster, migrating, by said one or more server computers, said website, said IP address and said loopback interface to said destination server computer without requiring an update of one or more Domain Name System (DNS) entries for said website; and
G) updating, by said one or more of said plurality of server computers, said routing table, via said dynamic announcement from said destination server computer, to direct network traffic for said website to said IP address via said loopback interface on said destination server computer.

2. The method of claim 1 wherein said loopback interface:
i) comprises a virtual interface assigned to said IP address, said virtual interface comprising a software not assigned to said physical network interface on said source server computer or to a physical network interface on said destination server computer;
ii) is configured to send or receive said network traffic between said one or more network components and said IP address via said virtual interface;
iii) is managed remotely through said network by a network management control panel.

3. The method of claim 1 wherein said plurality of metrics are stored in an electronic table, a file or a database within said network and comprise a plurality of network information about a utilization of said network and further comprise any combination of:
i) one or more metrics gathered and stored in said routing table of said router;
ii) one or more management datagrams generated by said loopback interface; and
iii) one or more fault tolerance or load distribution alerts generated by said IP address.

4. The method of claim 1 wherein said plurality of metrics:
i) determine said overload state by creating a threshold at which said alert is generated;

ii) are variables assigned to one or more network resources within said network as a means of ranking a performance of said one or more network resources from best to worst or from most preferred to least preferred;
iii) are configured to determine said best of said one or more network resources to be used when multiple of said one or more network resources are available; and
iv) are configured to determine when a migration of said website, said IP address and said loopback interface to said destination server computer is recommended and that said destination server computer is said most preferred of said one or more network resources.

5. The method of claim 1 wherein said alert comprises a high load on said source server computer and a lower load configuration available on said destination server computer and wherein said alert is displayed on a network management control panel comprising a graphical user interface displayed on a client computer communicatively coupled to said network and configured to control one or more software components and one or more hardware components within said network.

6. The method of claim 5 further comprising the steps of:
i) receiving, from said graphical user interface on said network management control panel, by said one or more server computers, a selection of:
   a) said source server computer from which to migrate said website; and
   b) said destination server computer to which to migrate said website; and
ii) extrapolating, from said selection of said first server computer, by said one or more of said plurality of said server computers, said IP address.

7. The method of claim 5 wherein said management control panel further comprises any combination of:
i) a first graphical user interface element, wherein, responsive to receiving a selection of said first graphical user interface element, said one or more of said plurality of server computers are configured to automatically calculate a best distribution of resources and a best migration strategy for said best distribution, and automatically migrate said website, said IP address and said loopback interface to said destination server computer;
ii) a second graphical user interface element, wherein, responsive to receiving a selection of said second graphical user interface element, said one or more of said plurality of server computers are configured to automatically calculates said best distribution of resources and said best migration strategy and to receive an authorization to migrate said website, said IP address and said loopback interface to said destination server computer;
iii) a third graphical user interface element, wherein, responsive to receiving a selection of said third graphical user interface element, said one or more of said plurality of server computers are configured to automatically calculate said best distribution of resources and said best migration strategy and display on said management control panel said best distribution of resources, said best migration strategy and manual migration control panel to manually migrate said website, said IP address and said loopback interface to said destination server computer;
iv) a fourth graphical user interface element, wherein, responsive to receiving a selection of said fourth graphical user interface element, said one or more of said plurality of server computers are configured to receive a selection of said source server computer and said destination server computer and is further configured to confirm, responsive to selection of said fourth graphical user interface element, whether said selection of said source server computer and said destination server computer constitutes said best distribution of resources and said best migration strategy; and
v) a fifth graphical user interface element, wherein, responsive to receiving a selection of said fifth graphical user interface element, said one or more of said plurality of server computers are configured to display on said management control panel said manual migration control panel.

8. The method of claim 1 wherein said migrating step F) further comprises the steps of:
i) installing a server software on said destination server computer;
ii) instantiating and verifying a proper operation of said IP address on said destination server computer;
iii) performing one or more mounting checks and one or more access checks for a central and shared storage for said website on said destination server computer;
iv) configuring one or more local processes on said destination server computer;
v) verifying a proper operation of said destination server computer;
vi) mapping, from a plurality of mapping data on said routing table, a migration route from said source server computer to said destination server computer, said route for migration being determined from said dynamic announcement;
vii) removing configuration data, processes and unneeded data mounts on said source server computer; and
viii) removing said dynamic announcement from said source server computer.

9. The method of claim 1 wherein said migration module is configured, during migration of said website, said IP address and said loopback interface, to place a freeze, disabling functionality to view or change one or more applications, one or more processes or one or more accounts of a file system on said source server computer, on one or more read/write capabilities of said source server computer until configuration, migration and verification of said website, said IP address and said loopback interface are complete.

10. The method of claim 1 wherein:
i) said one or more DNS entries are stored in a DNS comprising a distributed database system maintained by a directory host configured to translate at least one domain name to said IP address;
ii) said IP address is assigned to said at least one domain name independent of a physical routing hierarchy or one or more IP routing arrangements within said network; and
iii) said DNS entries are not updated responsive to migration of said website, said IP address and said loopback interface.

11. A system comprising:
A) a server cluster communicatively coupled to a network;
B) a source server computer within said server cluster comprising a loopback interface and hosting a website accessible to one or more network components within said network via an Internet Protocol (IP) address;
C) one or more server computers within said server cluster running a provisioning module configured to:
i) bind said IP address to said website;
ii) assign said IP address to said loopback interface without binding said IP address to a physical network interface on said source server computer; and iii) transmit to a router servicing said server cluster, via a routing protocol, a dynamic announcement, from said source server computer, of a network path to said IP address via said loopback interface, wherein, responsive to receiving said dynamic announcement, said router updates a routing table stored in said router to reflect said network path to said IP address via said loopback interface on said source server computer; and D) one or more of said one or more server computers within said server cluster running a network resource utilization module configured to:
  i) monitor, via a plurality of metrics from said router, said loopback interface and said IP address, a steady state of a network resource utilization by said website on said source server computer;
  ii) responsive to said plurality of metrics reaching an overload state outside of said steady state, generate an alert of said overload state;

E) one or more of said one or more server computers within said server cluster running a migration module configured to:
  i) responsive to said alert, identify a destination server computer within said server cluster, migrate said website, said IP address and said loopback interface to said destination server computer without requiring an update of one or more Domain Name System (DNS) entries for said website; and
  ii) update said routing table, via said dynamic announcement from said destination server computer, to direct network traffic for said website to said IP address via said loopback interface on said destination server computer.

12. The system of claim 11 wherein said loopback interface:
  i) comprises a virtual interface assigned to said IP address, said virtual interface comprising a software not assigned to said physical network interface on said source server computer or to a physical network interface on said destination server computer;
  ii) is configured to send or receive said network traffic between said one or more network components and said IP address via said virtual interface;
  iii) is managed remotely through said network by a network management control panel.

13. The system of claim 11 wherein said plurality of metrics are stored in an electronic table, a file or a database within said network and comprise a plurality of network information about a utilization of said network and further comprise any combination of:
  i) one or more metrics gathered and stored in said routing table of said router;
  ii) one or more management datagrams generated by said loopback interface; and
  iii) one or more fault tolerance or load distribution alerts generated by said IP address.

14. The system of claim 11 wherein said plurality of metrics:
  i) determine said overload state by creating a threshold at which said alert is generated;
  ii) are variables assigned to one or more network resources within said network as a means of ranking a performance of said one or more network resources from best to worst or from most preferred to least preferred;
  iii) are configured to determine said best of said one or more network resources to be used when multiple of said one or more network resources are available; and
  iv) are configured to determine when a migration of said website, said IP address and said loopback interface to said destination server computer is recommended and that said destination server computer is said most preferred of said one or more network resources.

15. The system of claim 11 wherein said alert comprises a high load on said source server computer and a lower load configuration available on said destination server computer and wherein said alert is displayed on a network management control panel comprising a graphical user interface displayed on a client computer communicatively coupled to said network and configured to control one or more software components and one or more hardware components within said network.

16. The system of claim 15 wherein said one or more server computers are configured to:
  i) receive, from said graphical user interface on said network management control panel, a selection of:
    a) said source server computer from which to migrate said website; and
    b) said destination server computer to which to migrate said website; and
  ii) extrapolate, from said selection of said first server computer, said IP address.

17. The system of claim 15 wherein said management control panel further comprises any combination of:
  i) a first graphical user interface element, wherein, responsive to receiving a selection of said first graphical user interface element, said one or more of said plurality of server computers are configured to automatically calculate a best distribution of resources and a best migration strategy for said best distribution, and automatically migrate said website, said IP address and said loopback interface to said destination server computer;
  ii) a second graphical user interface element, wherein, responsive to receiving a selection of said second graphical user interface element, said one or more of said plurality of server computers are configured to automatically calculates said best distribution of resources and said best migration strategy and to receive an authorization to migrate said website, said IP address and said loopback interface to said destination server computer;
  iii) a third graphical user interface element, wherein, responsive to receiving a selection of said third graphical user interface element, said one or more of said plurality of server computers are configured to automatically calculate said best distribution of resources and said best migration strategy and display on said management control panel said best distribution of resources, said best migration strategy and manual migration control panel to manually migrate said website, said IP address and said loopback interface to said destination server computer;
  iv) a fourth graphical user interface element, wherein, responsive to receiving a selection of said fourth graphical user interface element, said one or more of said plurality of server computers are configured to receive a selection of said source server computer and said destination server computer and is further configured to confirm, responsive to selection of said fourth graphical user interface element, whether said selection of said source server computer and said destination server computer constitutes said best distribution of resources and said best migration strategy; and
  v) a fifth graphical user interface element, wherein, responsive to receiving a selection of said fifth graphical user interface element, said one or more of said plurality of server computers are configured to display on said management control panel said manual migration control panel.

18. The system of claim 11 wherein said migration module is further configured to:
   i) install a server software on said destination server computer;
   ii) instantiate and verify a proper operation of said IP address on said destination server computer;
   iii) perform one or more mounting checks and one or more access checks for a central and shared storage for said website on said destination server computer;
   iv) configure one or more local processes on said destination server computer;
   v) verify a proper operation of said destination server computer;
   vi) map, from a plurality of mapping data on said routing table, a migration route from said source server computer to said destination server computer, said route for migration being determined from said dynamic announcement;
   vii) remove configuration data, processes and unneeded data mounts on said source server computer; and
   viii) remove said dynamic announcement from said source server computer.

19. The system of claim 11 wherein said migration module is configured, during migration of said website, said IP address and said loopback interface, to place a freeze, disabling functionality to view or change one or more applications, one or more processes or one or more accounts of a file system on said source server computer, on one or more read/write capabilities of said source server computer until configuration, migration and verification of said website, said IP address and said loopback interface are complete.

20. The system of claim 11 wherein:
   i) said one or more DNS entries are stored in a DNS comprising a distributed database system maintained by a directory host configured to translate at least one domain name to said IP address;
   ii) said IP address is assigned to said at least one domain name independent of a physical routing hierarchy or one or more IP routing arrangements within said network; and
   iii) said DNS entries are not updated responsive to migration of said website, said IP address and said loopback interface.

* * * * *